(12) United States Patent
Moon et al.

(10) Patent No.: US 12,079,435 B2
(45) Date of Patent: *Sep. 3, 2024

(54) TOUCH SENSOR AND DISPLAY DEVICE INCLUDING THE SAME

(71) Applicant: Samsung Display Co., Ltd., Yongin-si (KR)

(72) Inventors: Sung Jae Moon, Yongin-si (KR); Hwan Hee Jeong, Yongin-si (KR); Won Kyu Kwak, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,495

(22) Filed: May 4, 2023

(65) Prior Publication Data

US 2023/0273701 A1 Aug. 31, 2023

Related U.S. Application Data

(63) Continuation of application No. 17/750,278, filed on May 20, 2022, now Pat. No. 11,681,404, which is a (Continued)

(30) Foreign Application Priority Data

Aug. 17, 2017 (KR) .......................... 10-2017-0103982

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/04164* (2019.05);
(Continued)

(58) Field of Classification Search
CPC .... G06F 3/0446; G06F 3/044; G06F 3/04164; G06F 3/0443; G06F 3/0412;
(Continued)

(56) References Cited

U.S. PATENT DOCUMENTS 9,195,348 B2 11/2015 Kim et al.
10,152,147 B2 12/2018 Choi et al.
(Continued)

FOREIGN PATENT DOCUMENTS

| KR | 10-2012-0040812 A | 4/2012 |
|---|---|---|
| KR | 10-2013-0046263 A | 5/2013 |
| KR | 10-2016-0000817 A | 1/2016 |

*Primary Examiner* — Patrick N Edouard
*Assistant Examiner* — Joseph P Fox
(74) *Attorney, Agent, or Firm* — Innovation Counsel LLP

(57) ABSTRACT

A touch sensor includes a base layer including a first to third sensing region and a non-sensing region surrounding the first to third sensing region; a plurality of touch electrode rows provided in the first to third sensing regions and including a plurality of first touch electrodes connected in a first direction; and a plurality of touch electrode columns including a plurality of second touch electrodes connected in a second direction crossing the first direction. At least one of the first to third sensing regions has an area larger than that of other sensing regions. The non-sensing region includes an additional non-sensing region disposed between the second sensing region and the third sensing region and a bridge line provided in the additional non-sensing region and electrically connecting the first touch electrodes of the second sensing region to the first touch electrodes of the third sensing region.

20 Claims, 15 Drawing Sheets

Related U.S. Application Data continuation of application No. 16/989,809, filed on Aug. 10, 2020, now Pat. No. 11,340,744, which is a continuation of application No. 15/899,648, filed on Feb. 20, 2018, now Pat. No. 10,739,919.

(52) U.S. Cl.
CPC ............ *G06F 3/044* (2013.01); *G06F 3/0443* (2019.05); *G06F 2203/04111* (2013.01); *G06F 2203/04112* (2013.01)

(58) Field of Classification Search
CPC .. G06F 2203/04111; G06F 2203/04112; G06F 2203/04103
See application file for complete search history.

(56) References Cited

U.S. PATENT DOCUMENTS

| | | | |
|---|---|---|---|
| 10,739,919 B2* | 8/2020 | Moon | G06F 3/0443 |
| 11,340,744 B2* | 5/2022 | Moon | G06F 3/0412 |
| 11,681,404 B2* | 6/2023 | Moon | G06F 3/0412 |
| | | | 345/174 |
| 2010/0073319 A1 | 3/2010 | Lyon et al. | |
| 2012/0098787 A1 | 4/2012 | Kim et al. | |
| 2012/0169628 A1 | 7/2012 | Kuo et al. | |
| 2014/0132551 A1 | 5/2014 | Bathiche | |
| 2014/0347316 A1 | 11/2014 | Yeh et al. | |
| 2015/0077383 A1 | 3/2015 | Kang et al. | |
| 2016/0111040 A1 | 4/2016 | Kim et al. | |
| 2019/0033995 A1 | 1/2019 | Teramoto | |

\* cited by examiner

TOUCH SENSOR AND DISPLAY DEVICE INCLUDING THE SAME

CROSS-REFERENCE TO RELATED APPLICATIONS

This application is a continuation application of U.S. patent application Ser. No. 17/750,278 filed on May 20, 2022, which is a continuation application of U.S. patent application Ser. No. 16/989,809 filed on Aug. 10, 2020 (U.S. Pat. No. 11,340,744), which is a continuation application of U.S. patent application Ser. No. 15/899,648 filed on Feb. 20, 2018 (U.S. Pat. No. 10,739,919), which claims priority to Korean Patent Application No. 10-2017-0103982 filed in the Korean Intellectual Property Office on Aug. 17, 2017; the related applications are incorporated by reference.

BACKGROUND

1. Field

The present inventive concept relates to a touch sensor and a display device including the same.

2. Description of the Related Art

Recent display device has been developed to have information input function in addition to an image display function. The information input function of the display device may be implemented by an input sensor for inputting a user's touch. The touch sensor may be attached to one surface of a display panel which displays an image or may be integrally formed with the display panel. The user may input information by pressing or touching the touch sensor while viewing an image displayed on the display panel.

SUMMARY

An exemplary embodiment of the present inventive concept provides a touch sensor capable of realizing uniform touch sensitivity. In addition, an exemplary embodiment of the present inventive concept provides a display device including the touch sensor.

A touch sensor according to an exemplary embodiment of the present inventive concept includes a base layer including a first to third sensing regions and a non-sensing region surrounding the first to third sensing regions, wherein at least one of the first to third sensing regions has an area larger than that of other sensing regions; a plurality of touch electrode rows provided in the first to third sensing regions and including a plurality of first touch electrodes connected in a first direction; and a plurality of touch electrode columns including a plurality of second touch electrodes connected in a second direction crossing the first direction. The non-sensing region may include an additional non-sensing region disposed between the second sensing region and the third sensing region and a bridge line provided in the additional non-sensing region and electrically connecting the first touch electrodes of the second sensing region to the first touch electrodes of the third sensing region.

In an exemplary embodiment of the present inventive concept, the base layer may have a shape in which the second sensing region and the third sensing region protrude from the first sensing region in the second direction with a recessed portion disposed between the second sensing region and the third sensing region.

In an exemplary embodiment of the present inventive concept, the first sensing region may have a larger area than the second sensing region and the third sensing region.

In addition, the first sensing region may be wider than the second sensing region and the third sensing region.

In an exemplary embodiment of the present inventive concept, the bridge line may compensate for a difference between a load value of the first sensing region and a load value of each of the second sensing region and the third sensing region.

In an exemplary embodiment of the present inventive concept, the first touch electrodes of the second sensing region connected to one side of the bridge line and the first touch electrodes of the third sensing region connected to the other side of the bridge line may be provided in the same touch electrode row.

In an exemplary embodiment of the present inventive concept, the touch sensor may further include a first bridge pattern provided in the additional non-sensing region and electrically connecting one side of the bridge line to the first touch electrodes of the second sensing region; and a second bridge pattern provided in the additional non-sensing region and electrically connecting the other side of the bridge line to the first touch electrodes of the third sensing region.

In an exemplary embodiment of the present inventive concept, the first bridge pattern may be provided on the same layer as the first touch electrode of the second sensing region and the second bridge pattern is provided on the same layer as the first touch electrode of the third sensing region.

In an exemplary embodiment of the present inventive concept, the touch sensor may further include a plurality of first sensing lines provided in the non-sensing region and electrically connected to the plurality of touch electrode rows; and a plurality of second sensing lines provided in the non-sensing region and electrically connected to the plurality of touch electrode columns.

Herein, the bridge line may be provided on the same layer as the first sensing lines and the second sensing lines.

In an exemplary embodiment of the present inventive concept, the touch sensor may further include an insulating layer disposed on the base layer and having at least one or more contact holes; and a first contact electrode disposed on the insulating layer and electrically connected to the bridge line through the contact hole.

In an exemplary embodiment of the present inventive concept, the first contact electrode overlaps the bridge line in a plane view, is provided on the same layer as the first touch electrodes, and includes the same material as the first touch electrodes.

Herein, the first contact electrode electrically connects the bridge lines adjacent to each other in the first direction.

In an exemplary embodiment of the present inventive concept, the touch sensor may further include a second contact electrode overlapping the bridge line and is electrically connected to at least one of the second sensing lines.

The second contact electrode may be provided on the same layer as the second touch electrodes and includes the same material as the second touch electrodes.

Herein, the second contact electrode may be provided integrally with the corresponding second touch electrode.

In an exemplary embodiment of the present inventive concept, the touch sensor may further include a ground line provided in the non-sensing region and transmitting a ground voltage to the first to third sensing regions.

In an exemplary embodiment of the present inventive concept, the ground line may include a dummy portion overlapping at least one of the first sensing lines in a plane view.

In an exemplary embodiment of the present inventive concept, the ground line may include a first metal layer disposed on the base layer; and a second metal layer disposed on the first metal layer with the insulating layer interposed therebetween.

The second metal layer may be formed by the same material and the same process as the dummy portion.

In addition, the dummy portion is provided on the same layer as the first touch electrode provided in each of the second sensing region and the third sensing region.

A display device according to an exemplary embodiment of the present inventive concept a display panel; and a touch sensor disposed on at least one surface of the display panel.

The touch sensor may include a base layer including a first to third sensing regions and a non-sensing region surrounding the first to third sensing region; a plurality of touch electrode rows provided in the first to third sensing regions and including a plurality of first touch electrodes connected in a first direction; and a plurality of touch electrode columns including a plurality of second touch electrodes connected in a second direction crossing the first direction. At least one of the first to third sensing regions may have an area larger than that of other sensing regions. The non-sensing region may include an additional non-sensing region disposed between the second sensing region and the third sensing region; and a bridge line provided in the additional non-sensing region and electrically connecting the first touch electrodes of the second sensing region to the first touch electrodes of the third sensing region.

According to an exemplary embodiment of the present inventive concept, a touch sensor capable of realizing uniform touch sensitivity and a display device including the same may be provided.

DETAILED DESCRIPTION OF THE EMBODIMENTS

Figure 1:
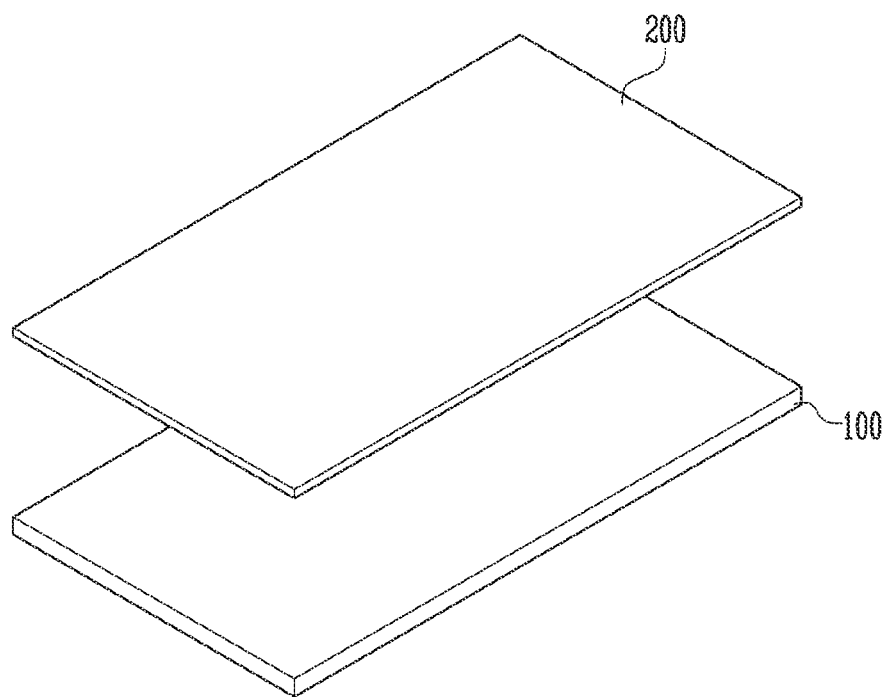
FIG. 1 is an exploded perspective view for illustrating a display device including a touch sensor according to an exemplary embodiment of the present inventive concept.

It will be apparent to those skilled in the art that various modifications and variations can be made in the present disclosure without departing from the spirit or scope of the disclosure, and specific exemplary embodiments are exemplified in the drawings and explained in the detailed description. Thus, it is intended that the present inventive concept covers the modifications and variations of this inventive concept provided they come within the scope of the present inventive concept and their equivalents.

Like reference numerals designate like elements throughout the specification. In the accompanying drawings, dimensions of structures are exaggerated for clarity. The terms, 'first', 'second' and the like may be simply used for description of various constituent elements, but those meanings may not be limited to the restricted meanings. The above terms are used only for distinguishing one constituent element from other constituent elements. For example, a first constituent element may be referred to as a second constituent element and similarly, the second constituent element may be referred to as the first constituent element within the scope of the appended claims. When explaining the singular, unless explicitly described to the contrary, it may be interpreted as the plural meaning.

In the specification, the word "comprise" or "has" is used to specify existence of a feature, a numbers, a process, an operation, a constituent element, a part, or a combination thereof, and it will be understood that existence or additional possibility of one or more other features or numbers, processes, operations, constituent elements, parts, or combinations thereof are not excluded in advance. In addition, it will be understood that when an element such as a layer, film, region, or substrate is referred to as being "on" another element, it can be directly on the other element or intervening elements may also be present. In the specification, it will be understood that when an element such as a layer, film, region, or substrate is referred to as being disposed "on" another element, the disposed direction is not limited to an upper direction and include a side direction or a lower direction. In contrast, It will be understood that when an element such as a layer, film, region, or substrate is referred to as being "beneath" another element, it can be directly beneath the other element or intervening elements may also be present.

Hereinafter, preferably exemplary embodiments of the present inventive concept will be described in further detail with reference to the accompanying drawings.

Figure 2:
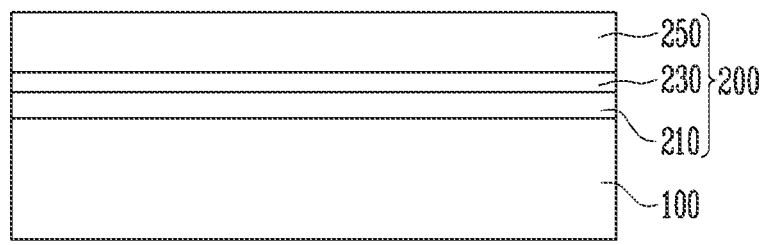
FIG. 2 is a schematic cross-sectional view of a display device shown in FIG. 1.
Figure 3:
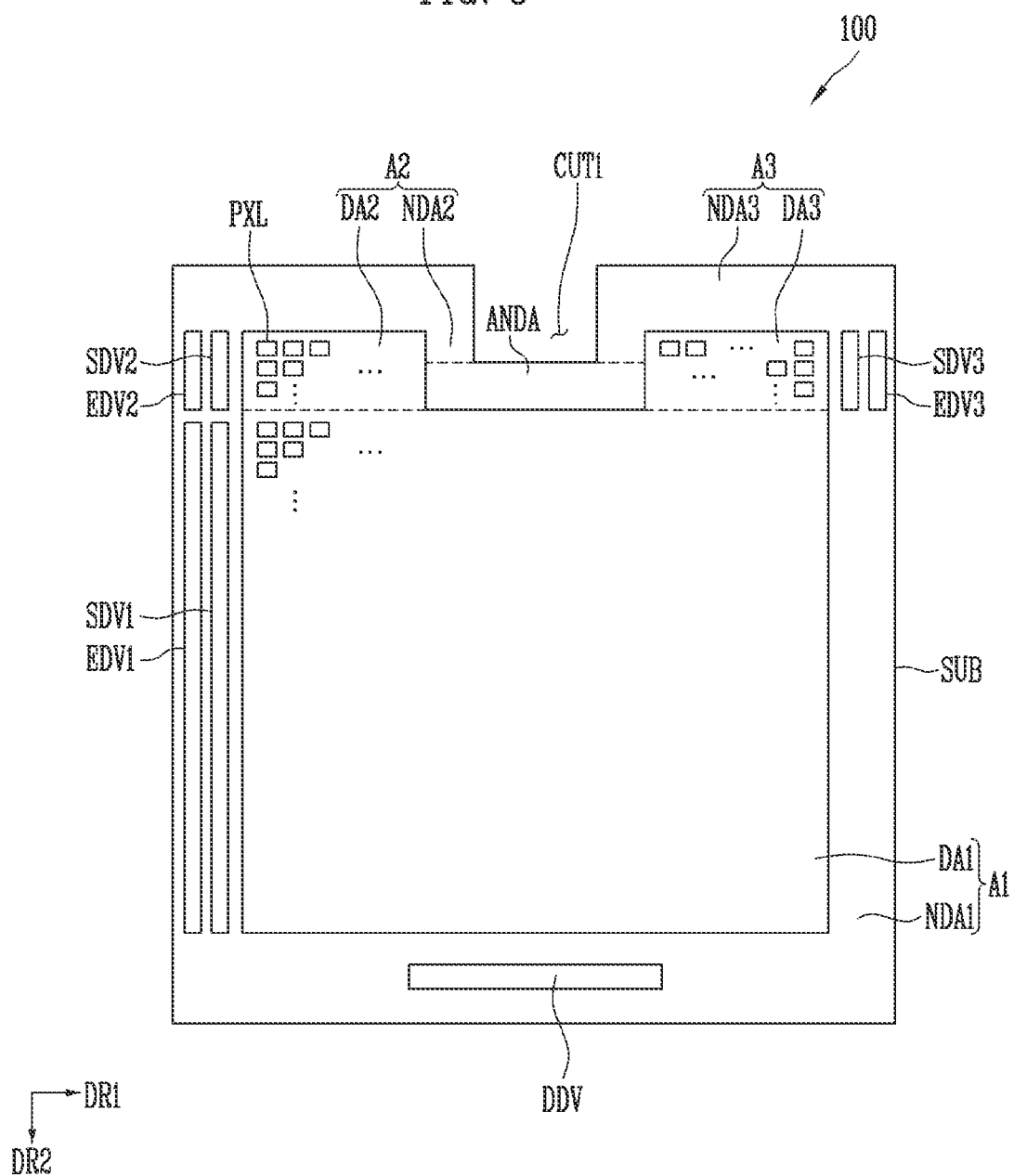
FIG. 3 is a plan view for illustrating a display panel shown in FIG. 1.

FIG. 1 is an exploded perspective view for illustrating a display device including a touch sensor according to an exemplary embodiment of the present inventive concept, FIG. 2 is a schematic cross-sectional view of a display device shown in FIG. 1, and FIG. 3 is a plan view for illustrating a display panel shown in FIG. 1.

Referring to FIGS. 1 to 3, a display device according to an exemplary embodiment of the present inventive concept may include a display panel 100 and a touch sensor 200.

The display panel 100 may display an image. The display panel 100 is not particularly limited. For example, a self-luminescent display panel such as an organic light emitting display panel (OLED panel) may be used as the display panel 100. In addition, a non-luminescent display panel such as a liquid crystal display panel (LCD panel), an electrophoretic display panel (EPD panel), and an electro-wetting display panel (EWD panel) may be used as the display panel 100. When the non-luminous display panel is used as the display panel 100, the display device DD may include a back-light unit for supplying light to the display panel 100. In the following exemplary embodiment, the organic light emitting display panel will be described as an example of the display panel 100.

The display panel 100 may include a substrate SUB, pixels PXL, a driver, a power supply, and a signal lines.

The substrate SUB includes a plurality of regions, and at least two of the regions may have different areas. The substrate SUB may be provided in substantially the same shape corresponding to a shape of the touch sensor 200. The substrate SUB may have the same area as the touch sensor 200 or may have a larger area than the touch sensor 200. In an exemplary embodiment of the present inventive concept, the substrate SUB may have the first to third regions A1, A2, and A3 having different areas from each other.

Each of the first to third regions A1, A2, and A3 may have various shapes. For example, each of the first to third regions A1, A2, and A3 may have various shapes such as a closed polygon including a side having shape of a straight line, a circle and an ellipse including a side having shape of a curved line, and a semicircle and a semi-ellipse including a side having shape of a straight line and a curved line, and the like.

The first to third regions A1, A2, and A3 may include display regions DA1, DA2, and DA3 (hereinafter referred to as DA) and non-display regions NDA1, NDA2, and NDA3 (hereinafter referred to as NDA). The display region DA is a region where the pixels PXL for displaying an image are provided. Each pixel PXL will be described later.

In an exemplary embodiment of the present inventive concept, each of the first to third display regions DA1, DA2, and DA2 may have a shape corresponding to a shape of each of the first to third regions A1, A2, and A3.

The non-display area NDA is a region where the pixels PXL are not provided and an image is not displayed. The driver for driving the pixels PXL, the power supply for supplying power to the pixels PXL, and a portion of the signal lines (not shown) for connecting the pixels PXL and the driver are provided in the non-display region NDA. The non-display region NDA corresponds to a bezel of a final display device and a width of the bezel may be determined according to a width of the non-display region NDA.

Each of the first to third regions A1, A2, and A3 will now be described as follows.

The first region A1 may have the largest area among the first to third regions A1, A2, and A3. The first region A1 may include a first display region DA1 for displaying an image and a first non-display region NDA1 surrounding at least a portion of the first display region DA1.

The second region A2 may have a smaller area than the first region A1. The second region A2 may include a second display region DA2 for displaying an image and a second non-display region NDA2 surrounding at least a portion of the second display region DA2.

The third region A3 may have a smaller area than the first region A1. For example, the third region A3 may have the same area as the second region A2. The third region A3 may include a third display region DA3 for displaying an image and a third non-display region NDA3 surrounding at least a portion of the third display region DA3.

The substrate SUB may have a shape in which the second and third regions A2 and A3 protrude from the first region A1 in a second direction DR2. The second and third regions A2 and A3 may be spaced apart from each other along the first direction by a predetermined distance in the substrate SUB. Accordingly, the substrate SUB may have a shape in which a region between the second region A2 and the third region A3 is recessed. That is, the substrate SUB may have a recessed portion between the second region A2 and the third region A3. The recessed portion may be a first cut portion CUT1 in which a portion of the substrate SUB is cut and removed through a cutting process or the like.

In an exemplary embodiment of the present inventive concept, the substrate SUB may further include an additional non-display region ANDA.

The additional non-display region ANDA may be provided adjacent to the first display region DA1, the second display region DA2, and the third display region DA3. In addition, the additional non-display region ANDA may connect the second non-display region NDA2 and the third non-display region NDA3.

The pixels PXL may be provided in the first to third display regions DA1, DA2, and DA3. Each pixel PXL is a minimum unit for displaying an image and a plurality of pixels PXL may be provided in the first to third display regions DA1, DA2, and DA3. Each pixel PXL may include a display element which emits light. For example, the display element may be any one of a liquid crystal display element, an electrophoretic display element, an electrowetting display element, and an organic light emitting display element. In the following, for convenience of description, the organic light emitting display element will be described as an example of the display element.

Each of the pixels PXL may emit one color of red, green, and blue, but is not limited thereto. For example, each of the pixels PXL may emit colors such as cyan, magenta, yellow, and white. The pixels PXL may be arranged in a matrix configuration along a row extending in the first direction DR1 and a column extending in the second direction DR2. The arrangement of the pixels PXL is not particularly limited to the matrix configuration and may be arranged in various forms.

The driver supplies a signal to each pixel PXL through the signal lines, thereby controlling the driving of each pixel PXL. The driver may include first to third scan drivers SDV1, SDV2 and SDV3 for providing a scan signal to each pixel PXL through a scan line, the first to third emission drivers EDV1, EDV2, and EDV3 for providing an emission control signal to each pixel EXL through an emission control line, a data driver DDV for providing a data signal to each pixel PXL through a data line, and a timing controller (not shown). The timing controller may control the first to third scan drivers SDV1, SDV2, and SDV3, the first to third emission drivers EDV1, EDV2, and EDV3, and the data driver DDV.

The data driver DDV may be disposed in the first non-display region NDA1. In particular, the data driver DDV may be disposed in the first non-display region NDA1 in which the first to third scan drivers SDV1, SDV2 and SDV3 are not disposed. The data driver DDV may extend in the width direction of the first non-display region NDA1.

In an exemplary embodiment of the present inventive concept, the locations of the first to third scan drivers SDV1, SDV2 and SDV3 and the first to third emission drivers EDV1, EDV2 and EDV3 and/or the data driver DDV may be changed as needed. The timing controller may be connected to the first to third scan drivers SDV1, SDV2 and SDV3, the first to third emission drivers EDV1, EDV2 and EDV3, and the data driver DDV through signal lines in various ways. The location of the timing controller is not particularly limited. For example, the timing controller may be mounted on a printed circuit board (not shown), and may be connected to the first to third scan drivers SDV1, SDV2, and SDV3, the first to third emission drivers EDV1, EDV2, and EDV3, and the data driver DDV through a flexible printed circuit board, and the printed circuit board may be disposed at various locations such as a front side or a rear side of the substrate SUB.

The power supply (not shown) may include at least one power supply line. For example, the power supply may include a first power supply line (not shown) and a second power supply line (not shown). The power supply may supply power to the pixels PXL disposed in each of the first to third display regions DA1, DA2, and DA3. In an exemplary embodiment of the present inventive concept, the voltage applied to the first power supply line may be higher than the voltage applied to the second power supply line.

The touch sensor 200 may be disposed on at least one of opposing surfaces of the display panel 100. For example, the touch sensor 200 may be disposed on a front surface of the display panel 100 in which an image is displayed, so as to receive a user's touch input. In addition, the touch screen 200 may be formed integrally with the display panel 100. In an exemplary embodiment of the present inventive concept, the touch sensor 200 on the front surface of the display panel 100 will be described as an example.

The touch sensor 200 may include a touch sensor layer 210 disposed on the upper surface of the display panel 100 and an insulating layer 230 disposed on the touch sensor layer 210.

The touch sensor layer 210 may recognize a touch event when a user's hand or a separate input means touch the front surface of the display panel 100. In an exemplary embodiment of the present inventive concept, the touch sensor layer 210 may be a mutual-capacitance type touch sensor. The mutual-capacitance type touch sensor senses a change in capacitance due to an interaction between two touch sensing electrodes. In addition, the touch sensor layer 210 may be a self-capacitance type. The self-capacitance type senses a change in capacitance of a sensing electrode of a touched region when a user touches the sensing electrode, by using touch sensing electrodes arranged in a matrix configuration and sensing lines respectively connected to the touch sensing electrodes.

The touch sensor layer 210 may include a touch electrode, a sensing line connected to the touch electrode, and a pad connected to one end of the sensing line. The touch sensor layer 210 will be described hereinafter.

The insulating layer 230 covers the touch sensor layer 210 and protects the touch sensor layer 210 from an external impact from the outside. According to an exemplary embodiment, the insulating layer 230 includes an elastic material, thereby being deformed by pressure of touch by the user. In this case, the touch sensor layer 210 may further include a pressure electrode which forms a capacitor together with the touch electrode.

The touch sensor 200 may further include a window 250 disposed on the insulating layer 230.

The window 250 may be made of a transparent material. The window 250 may protect an exposed surface of the touch screen 200. The window 250 transmits an image from the display panel 100 and alleviates an external impact, thereby preventing the display panel 100 from being broken or malfunctioning due to the external impact. The external impact may mean a force that causes a defect in the display panel 100 as an external force which may be expressed by pressure, stress, or the like. The window 250 may be entirely or at least partially flexible.

Figure 4:
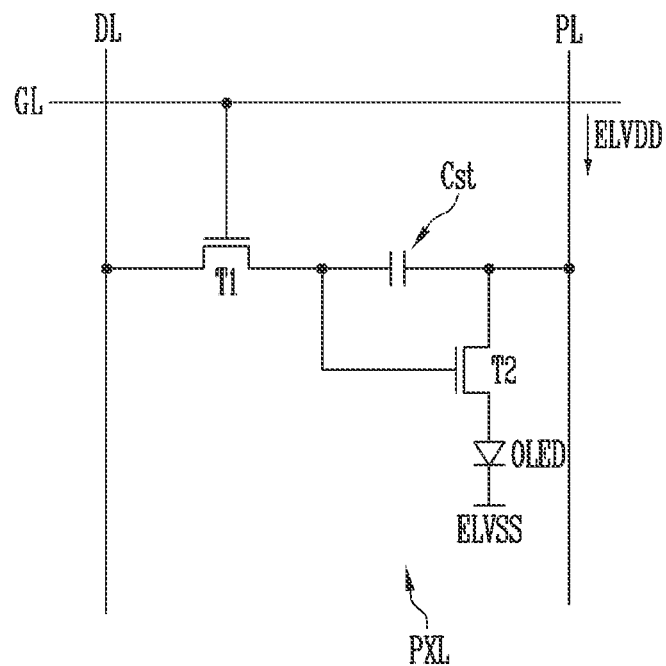
FIG. 4 is an equivalent circuit diagram illustrating one of pixels shown in FIG. 3.

FIG. 4 is an equivalent circuit diagram illustrating one of pixels shown in FIG. 3. In FIG. 4, for convenience of description, one pixel and lines connected to the pixel are mainly shown.

Referring to FIGS. 3 and 4, each pixel PXL may include a transistor connected to signal lines, an organic light emitting diode OLED connected to the transistor, and a capacitor Cst. The organic light emitting diode OLED may be a top-emission type organic light emitting diode or a bottom-emission type organic light emitting diode.

Each pixel PXL may include a pixel driving circuit for driving the organic light emitting diode OLED and the pixel driving circuit may include a first transistor T1 (or a switching transistor), a second transistor T2 (or a driving transistor), and the capacitor Cst. A first power supply voltage ELVDD may be transmitted to the second transistor T2 through a power line PL and a second power supply voltage ELVSS may be transmitted to the organic light emitting diode OLED. The second power supply voltage EVLSS may be set to a voltage lower than the first power supply voltage ELVDD.

The first transistor T1 outputs a data signal supplied from the data line DL in response to a scan signal applied to the gate line GL. The capacitor Cst charges a voltage corresponding to the data signal received from the first transistor T1. The second transistor T2 is connected to the organic light emitting diode OLED. The second transistor T2 controls a driving current flowing to the organic light emitting diode OLED according to the amount of charge stored in the capacitor Cst.

In an exemplary embodiment of the present inventive concept, one pixel PXL includes two transistors T1 and T2. However, the exemplary embodiment is not limited thereto, and one pixel PXL may include one transistor and one capacitor, or may include three or more transistors and two or more capacitors. For example, one pixel PXL may include seven transistors, a light emitting element OLED, and a capacitor Cst.

Figure 5:
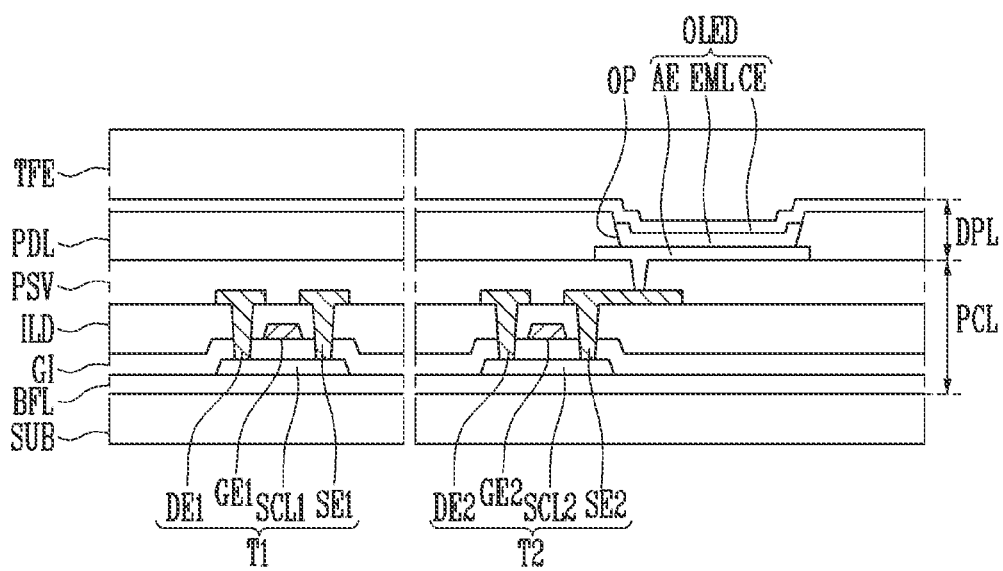
FIG. 5 is a cross-sectional view illustrating a portion of a display panel according to an exemplary embodiment of the present inventive concept.

FIG. 5 is a cross-sectional view illustrating a portion of a display panel according to an exemplary embodiment of the present inventive concept.

Referring to FIG. 5, a display panel according to an exemplary embodiment of the present inventive concept may include a substrate SUB, a pixel circuit PCL, a display element layer DPL, and thin film encapsulation film TFE.

The substrate SUB may be formed of an insulating material such as glass, resin, and the like. In addition, the substrate SUB may be made of a flexible material so as to be bent or folded, and may have a single-layer structure or a multi-layer structure.

For example, the flexible material may include at least one selected from the group consisting of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, a material constituting the substrate SUB may be variously changed, and the base layer BL may be made of glass fiber reinforced plastic (FRP) or the like. In an exemplary embodiment of the present inventive concept, the substrate SUB may be made of a material having flexibility.

The pixel circuit PCL may include a buffer layer BFL disposed on the substrate SUB and first and second transistors T1 and T2 disposed on the buffer layer BFL.

The buffer layer BFL may prevent an impurity from diffusing into the first and second transistors T1 and T2.

The buffer layer BFL may be provided as a single layer, but may be provided as multiple layers of at least two layers. When the buffer layer BFL is provided as multiple layers, each layer may be formed of the same material or may be formed of different material. The buffer layer BFL may be omitted according to the material of the substrate SUB used and a process condition of manufacturing the display panel.

The first transistor T1 may be a switching transistor for switching the second transistor T2. The second transistor T2 may be a driving transistor electrically connected to the organic light emitting diode OLED of the display element layer DPL to drive the organic light emitting diode OLED.

The first transistor T1 may include a first semiconductor layer SCL1, a first gate electrode GE1, a first source electrode SE1, and a first drain electrode DE1. The second transistor T2 may include a second semiconductor layer SCL2, a second gate electrode GE2, a second source electrode SE2, and a second drain electrode DE2.

The first and second semiconductor layers SCL1 and SCL2 may be disposed on the buffer layer BFL. Each of the first and second semiconductor layers SCL1 and SCL2 may include a source region and a drain region which contact the first and second source electrodes SE1 and SE2 and the first and second drain electrodes DE1 and DE2, respectively. The region between the source region and the drain region may be a channel region. The first and second semiconductor layers SCL1 and SCL2 may be a semiconductor pattern made of polysilicon, amorphous silicon, oxide semiconductor, or the like. The channel region may be a semiconductor pattern which is not doped with an impurity, and may be an intrinsic semiconductor. The source region and the drain region may be a semiconductor pattern doped with the impurity. An n-type impurity, a p-type impurity, and other impurity such as metals may be used as the impurity.

The first gate electrodes GE1 may be provided on the first semiconductor layers SCL1 with a gate insulating layer GI interposed therebetween. The second gate electrodes GE2 may be provided on the second semiconductor layers SCL2 with a gate insulating layer GI interposed therebetween. Herein, the gate insulating layer GI may be an inorganic insulating layer including an inorganic material. For example, the gate insulating layer GI may be formed of silicon nitride, silicon oxide, silicon oxynitride, or the like.

The first source electrode SE1 and the first drain electrode DE1 may be respectively connected to the source region and the drain region of the first semiconductor layer SCL1 through a contact hole passing through an interlayer insulating layer ILD and the gate insulating layer GI. The second source electrode SE2 and the second drain electrode DE2 may be respectively connected to the source region and the drain region of the second semiconductor layer SCL2 through a contact hole passing through an interlayer insulating layer ILD and the gate insulating layer GI. The interlayer insulating layer ILD may be an inorganic insulating layer made of an inorganic material or an organic insulating layer made of an organic material.

The pixel circuit unit PCL may further include a passivation layer PSV disposed on the first and second transistors T1 and T2 to cover the first and second transistors T1 and T2. The passivation layer PSV may include at least one of an inorganic insulating layer made of an inorganic material and an organic insulating layer made of an organic material. For example, the passivation layer PSV may include the inorganic insulating layer and the organic insulating layer on the inorganic insulating layer.

The display element layer DPL may include an organic light emitting diode OLED disposed on the passivation layer PSV. The organic light emitting diode OLED may include first and second electrodes AE and CE, and an emission layer EML provided between the first and second electrodes AE and CE. Herein, one of the first and second electrodes AE and CE may be an anode electrode and the other of the first and second electrodes AE and CE may be a cathode electrode. For example, the first electrode AE may be the anode electrode and the second electrode CE may be the cathode electrode. When the organic light emitting diode OLED is a top emission type organic light emitting diode, the first electrode AE may be a reflective electrode and the second electrode CE may be a transmissive electrode. In an exemplary embodiment of the present inventive concept, the case where the organic light emitting diode OLED is a top emission type organic light emitting diode and the first electrode AE is an anode electrode will be described as an example.

The first electrode AE may be electrically connected to the second source electrode SE2 of the second transistor T2 through a contact hole passing through the passivation layer PSV. The first electrode AE may include a reflective layer (not shown) capable of reflecting light and a transparent conductive layer (not shown) disposed at the upper portion or the lower portion of the reflective layer. At least one of the transparent conductive layer and the reflective layer may be connected to the second source electrode SE2.

The display element layer DPL may further include a pixel definition layer PDL having an opening OP for exposing a portion of the first electrode AE, for example, an upper surface of the first electrode AE.

The pixel definition layer PDL may include an organic insulating material. For example, the pixel definition layer PDL may be made of at least one selected from the group consisting of polystyrene, polymethylmethacrylate (PMMA), polyacrylonitrile (PAN), polyimide (PA), polyimide (PI), polyarylether (PAE), heterocyclic polymer, parylene, epoxy, benzocyclobutene (BCB), siloxane based resin, and silane based resin.

The emission layer EML may be provided on the exposed surface of the first electrode AE.

The emission layer EML may include a low-molecular material or a high-molecular material. In an exemplary embodiment of the present inventive concept, the low-molecular material may include copper phthalocyanine (CuPc), N,N'-Di (naphthalene-1-yl)-N,N'-diphenyl-benzidine (NPB), tris-8-hydroxyquinoline aluminum (Alq3), or the like. The high-molecular material may include PEDOT, poly-phenylenevinylene (PPV) and polyfluorene, or the like.

The emission layer EML may be provided as a single layer, but may be provided as multiple layers including various functional layers. When the emission layer EML is provided as multiple layers, the emission layer EML may have the structure in which a hole injection layer, a hole transport layer, an light emitting layer, an electron transport layer, an electron injection layer, and the like are stacked in a single or a multiple structure. Of course, the emission layer EML is not necessarily limited thereto, and may have various structures. At least a portion of the emission layer EML may be integrally formed over a plurality of first electrodes AE, and may be individually formed corresponding to each of the plurality of first electrodes AE. The color of light emitted from the emission layer EML may be one of red, green, blue, and white, but the exemplary embodiment is not limited thereto. For example, the color of light emitted from the light generating layer of the emission layer EML may be one of magenta, cyan, and yellow.

The second electrode CE may be disposed on the emission layer EML. The second electrode CE may be transflective layer. For example, the second electrode CE may be a thin metal layer having a thickness enough to transmit light emitted from the emission layer EML. The second electrode CE may transmit a portion of light emitted from the emission layer EML and may reflect the other portion of light emitted from the emission layer EML.

The thin film encapsulation film TFE may be disposed on the organic light emitting diode OLED. The thin film encapsulation film TFE may be made of a single layer or multiple layers.

The thin film encapsulation film TFE may include a plurality of insulating layers covering the organic light emitting diode OLED.

Figure 6:
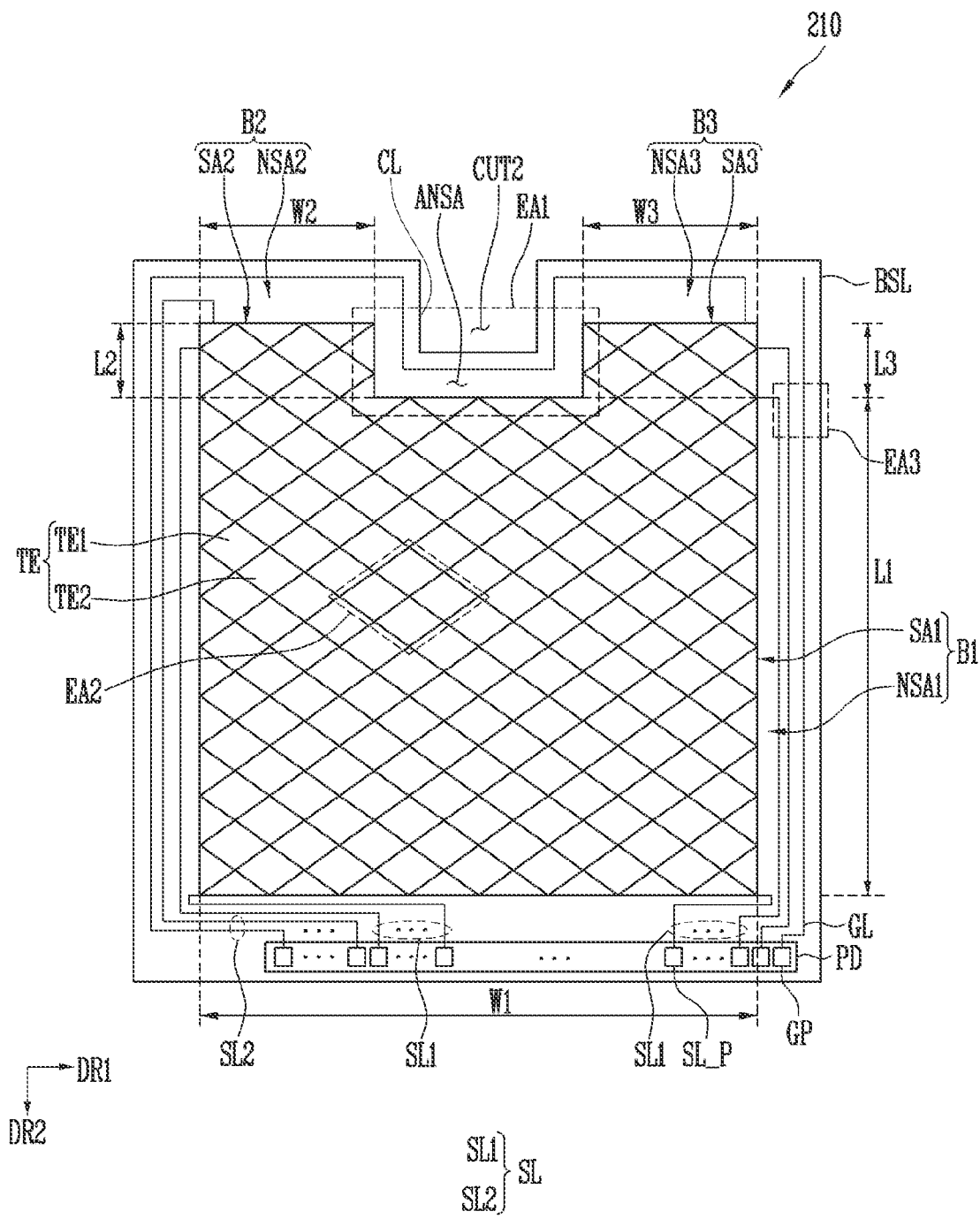
FIG. 6 is a plan view for illustrating a touch sensor layer shown in FIG. 2.
Figure 7:
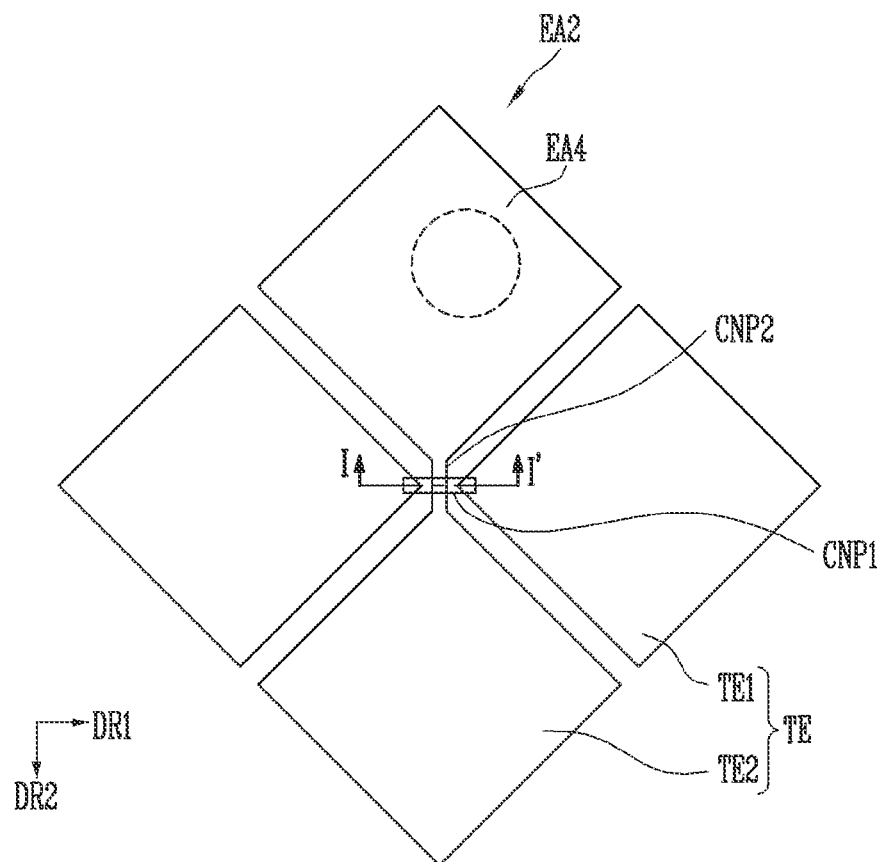
FIG. 7 is an enlarged view of an EA2 region in FIG. 6.
Figure 8:
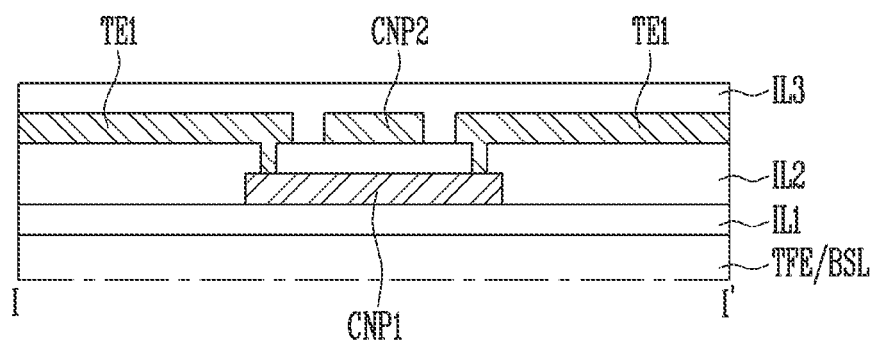
FIG. 8 is a cross-sectional view taken along a line I-I' of FIG. 7.
Figure 9:
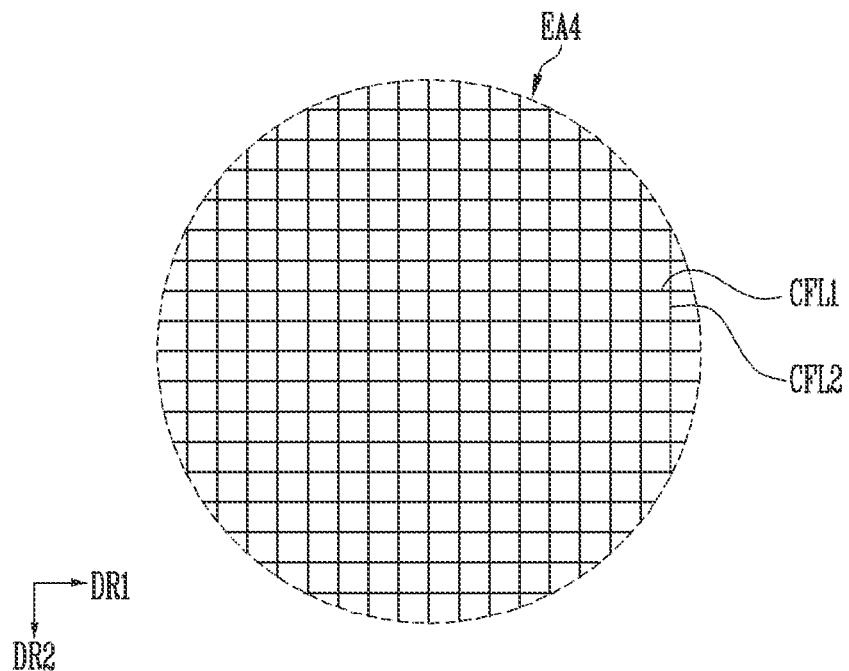
FIG. 9 is an enlarged view of an EA4 region in FIG. 7.

Specifically, the thin film encapsulation film TFE may include a plurality of inorganic layers and a plurality of organic layers. For example, the thin film encapsulation film TFE may have a structure in which the inorganic layer and the organic layer are alternately stacked. In addition, the thin film encapsulation film TFE may be an encapsulation substrate disposed on the organic light emitting element and adhered to the substrate SUB by using a sealant FIG. 6 is a plan view for illustrating a touch sensor layer shown in FIG. 2, FIG. 7 is an enlarged view of an EA2 region in FIG. 6, FIG. 8 is a cross-sectional view taken along a line I-I' of FIG. 7, and FIG. 9 is an enlarged view of an EA4 region in FIG. 7.

Referring FIGS. 2 and 6 to 9, the touch sensor layer 210 according to an exemplary embodiment of the present inventive concept may include a base layer BSL including a sensing region and a non-sensing region.

The base layer BSL may be a portion of the thin film encapsulation film TFE of the display panel 100. Specifically, the base layer BSL may be an inorganic insulating material disposed at the uppermost layer of the thin film encapsulation film TFE.

The base layer BSL includes a plurality of regions, and at least two of the regions may have different areas. Since the base layer BSL is provided in substantially the same shape as the substrate of the display panel 100 (see SUB in FIG. 3), the base layer BSL may include the first to third touch regions B1, B2, and B3 corresponding to three regions (see A1 to A3 in FIG. 3) provided on the substrate SUB.

Each of the first to third touch regions B1, B2, and B3 of the base layer BSL may have various shapes. For example, each of the first to third touch regions B1, B2, and B3 of the base layer BSL may have various shapes such as a closed polygon including a side having shape of a straight line, a circle and an ellipse including a side having shape of a curved line, and a semicircle and a semi-ellipse including a side having shape of a straight line and a curved line, and the like.

In an exemplary embodiment of the present inventive concept, the first to third touch regions B1, B2, and B3 of the base layer BSL may have a substantially rectangular shape.

Each of the first to third touch regions B1, B2, and B3 of the base layer BSL includes sensing regions SA1, SA2, and SA3 (hereinafter, referred to as 'SA'), and non-sensing regions NSA1, NSA2, and NSA3 (hereinafter, referred to as 'NSA'). The sensing region SA may correspond to a display region of the substrate SUB and the non-sensing region NSA may correspond to a non-display region of the substrate SUB.

A plurality of touch electrodes TE may be provided in the sensing region SA, and a plurality of sensing lines SL connecting the touch electrodes TE to the pads PD may be provided in the non-sensing region NSA.

The first to third touch regions B1, B2, and B3 of the base layer BSL will now be described.

The first touch region B1 may have the largest area among the first to third touch regions B1, B2, and B3. In an exemplary embodiment of the present inventive concept, the first touch region B1 may have a shape corresponding to the first region A1 of the substrate SUB. The first touch region B1 may include a first sensing region SA1 for sensing a user's touch, and a first non-sensing region NSA1 surrounding at least a portion of the first sensing region SA1.

The first sensing region SA1 may be provided in a shape corresponding to the shape of the first touch region B1. In addition, the first sensing region SA1 may be provided in a shape corresponding to the first display region (see DA1 in FIG. 3) of the first region A1 of the substrate SUB. In an exemplary embodiment of the present inventive concept, the first sensing region SA1 may have a first width W1 in a first direction DR1 and a first length L1 in a second direction DR2 crossing the first direction DR1.

The first non-sensing region NSA1 may be provided on at least one side of the first sensing region SA1. In an exemplary embodiment of the present inventive concept, the first non-sensing region NSA1 may surround the first sensing region SA1 and be disposed at a location other than a portion where the second touch region B2 and the third touch region B3 are disposed. The first non-sensing region NSA1 may include a horizontal portion extending in the first direction DR1 and a vertical portion extending in the second direction DR2. A pair of vertical portions of the first non-sensing region NDA1 may be spaced apart from each other in the first direction DR1 in the first sensing region SA1.

The second touch region B2 may have a smaller area than the first touch region B1. In an exemplary embodiment of the present inventive concept, the second touch region B2 may have a shape corresponding to the second region A2 of the substrate SUB. The second touch region B2 may include a second sensing region SA2 for sensing the user's touch and a second non-sensing region NSA2 surrounding at least a portion of the second sensing region SA2.

The second sensing region SA2 may be provided in a shape corresponding to the shape of the second touch region B2. In addition, the second sensing region SA2 may be provided in a shape corresponding to the second display region (see DA2 in FIG. 3) of the second region A2 of the substrate SUB.

In an exemplary embodiment of the present inventive concept, the second sensing region SA2 may have a second width W2 smaller than the first width W1 of the first sensing region SA1. The second sensing region SA2 may have a second length L2 smaller than the first length L1 of the first sensing region SA1. The second sensing region SA2 is provided in a shape protruding from the first sensing region SA1 in the second direction DR2 and may be directly connected to the first sensing region SA1. In other words, one side of the second sensing region SA2 may directly contact one side of the first sensing region SA1.

The second non-sensing region NSA2 may be provided on at least one side of the second sensing region SA2. The second non-sensing region NSA2 may include a horizontal portion extending in the first direction DR1 and a vertical portion extending in the second direction DR2. In an exemplary embodiment of the present inventive concept, the second non-sensing region NSA2 may surround the second sensing region SA2 and may not be provided at a portion where the first sensing region SA1 and the second sensing region SA2 are connected.

The third touch region B3 may have a smaller area than the first touch region B1. For example, the third touch region B3 may have the same area as the second touch region B2. In an exemplary embodiment of the present inventive concept, the third touch region B3 may have a shape corresponding to the third region A3 of the substrate SUB. The third touch region B3 may include a third sensing region SA3 for sensing the user's touch and a third non-sensing region NSA3 surrounding at least a portion of the third sensing region SA3.

The third sensing region SA3 may be provided in a shape corresponding to the shape of the third touch region B3. In addition, the third sensing region SA3 may be provided in a shape corresponding to the third display region (see DA3 in FIG. 3) of the third region A3 of the substrate SUB.

The third sensing region SA3 may have a third width W3 smaller than the first width W1 of the first sensing region SA1. The third sensing region SA3 may have a third length L3 smaller than the first length L1 of the first sensing region SA1. The second width W2 and the third width W3 may be equal to each other. In addition, the second length L2 and the third length L3 may be equal to each other.

The third sensing region SA3 may be provided in a shape protruding from the first sensing region SA1 and may be directly connected to the first sensing region SA1. That is, one side of the third sensing region SA3 may directly contact one side of the first sensing region SA1.

The third non-sensing region NSA3 may be provided on at least one side of the third sensing region SA3. The third non-sensing region NSA3 may include a horizontal portion extending in the first direction DR1 and a vertical portion extending in the second direction DR2. In an exemplary embodiment of the present inventive concept, the third non-sensing region NSA3 may surround the third sensing region SA3 and may not be provided at a portion where the first sensing region SA1 and the third sensing region SA3 are connected.

In an exemplary embodiment of the present inventive concept, the third touch region B3 may have a shape which is line-symmetric with the second touch region B2 having a virtual center line which extends in the second direction DR2 at a center portion of the horizontal portion of the first non-sensing region NSA1 as a line of symmetry. In this case, the arrangement relationship of each component provided in the third touch region B3 may be substantially the same as that in the second touch region B2 except for some signal lines.

In an exemplary embodiment of the present inventive concept, the vertical portions of the first non-sensing region NSA1 may be connected to a portion of the vertical portions of the second non-sensing region NSA2 and the third non-sensing region NSA3, respectively.

The base layer BSL may further include an additional non-sensing region ANSA. The additional non-sensing region ANSA may be adjacent to the first sensing region SA1, the second sensing region SA2, and the third sensing region SA3. In addition, the additional non-sensing region ANSA may be adjacent to the first sensing region SA1, the second non-sensing region NSA2, and the third non-sensing region NSA3.

In an exemplary embodiment of the present inventive concept, the additional non-sensing region ANSA may be adjacent to one side of the first sensing region SA1 between the second sensing region SA2 and the third sensing region SA3. The additional non-sensing region ANSA may have a shape corresponding to the shape of the second cutting portion CUT2. For example, the additional non-sensing region ANSA may have a rectangular shape as shown in the drawing, but is not limited thereto.

A plurality of touch electrodes TE may be disposed in the first to third sensing regions SA1, SA2, and SA3, and the sensing lines SL and the pad unit PD may be disposed in the first non-sensing region, but the present embodiment is not limited thereto, the pad unit PD may be disposed in the first to third non-sensing regions NSA1, NSA2, and NSA3.

Some of the touch electrodes TE may be arranged in the first direction DR1 and may be electrically connected to form a plurality of touch electrode rows extending parallel to each other. Herein, the touch electrodes TE included in the touch electrode rows may be the first touch electrodes TE1. In the touch electrode rows, the first touch electrodes TE1 adjacent to each other along the first direction may be electrically connected through the first connection pattern CNP1. In addition, others of the touch electrodes TE may be arranged in the second direction DR2 and electrically connected to form a plurality of touch electrode columns parallel to each other. Herein, the touch electrodes TE included in the touch electrode columns may be the second touch electrodes TE2. In the touch electrode columns, the second touch electrodes TE2 adjacent to each other may be electrically connected through the second connection pattern CNP2. Each of the touch electrode rows and the touch electrode columns may be electrically connected to the pad unit PD through the sensing lines SL.

One of the first touch electrodes TE1 and the second touch electrodes TE2 may receive a touch driving signal through respective sensing lines SL, and the other may transmit a touch sensing signal through others of the sensing lines SL. In an exemplary embodiment of the present inventive concept, the first touch electrodes TE1 may transmit the touch sensing signal and the second touch electrodes TE2 may receive the touch driving signal. The touch sensor layer 210 may detect a user's touch by sensing a change of a mutual capacitance formed between the first touch electrodes TE1 and the second touch electrodes TE2.

The touch sensor layer 210 may include a first insulating layer IL1, a first conductive layer disposed on the first insulating layer IL1, a second insulating layer IL2 covering the first conductive layer, a second conductive layer disposed on the second insulating layer IL2, and a third insulating layer IL3 covering the second conductive layer.

The first insulating layer IL1 may be disposed on the base layer BSL. In an exemplary embodiment of the present inventive concept, the base layer BSL may be a portion of the thin film encapsulation film TFE of the display panel 100. The first insulating layer IL1 may include at least one of an organic insulating material and an inorganic insulating material. For example, the first insulating layer IL1 may include at least one of silicon oxide, silicon nitride, and silicon oxynitride.

Meanwhile, in an exemplary embodiment of the present inventive concept, the first conductive layer is provided on the first insulating layer IL1, but the present embodiment is not limited thereto. For example, when the uppermost layer of the thin film encapsulation film TFE includes an inorganic insulating material, the first insulating layer IL1 may be omitted, and the first conductive layer may be provided on the thin film encapsulation film TFE. That is, the first conductive layer may be disposed directly on the thin film encapsulation film TFE.

The first conductive layer may include at least one of the first touch electrodes TE1, the second touch electrodes TE2, the first connection pattern CNP1, and the second connection pattern CNP2. For example, the first conductive layer may include the first connection pattern CNP1. The first conductive layer may include a conductive material. Herein, the conductive material may include a transparent conductive oxide or a metal material. In addition, the first conductive layer may include a plurality of stacked metal layers. The transparent conductive oxide may include Indium Tin Oxide (ITO), Indium Zinc Oxide (IZO), Antimony Zinc Oxide (AZO), Indium Tin Zinc Oxide (ITZO), Zinc Oxide (ZnO), Tin Oxide (SnO2), or the like. The metal material may include copper (Cu), silver (Ag), gold (Au), platinum (Pt), palladium (Pd), nickel (Ni), tin (Sn), aluminum (Al), cobalt (Co), rhodium (Rh), iridium (Ir), iron (Fe), ruthenium (Ru), osmium (Os), manganese (Mn), molybdenum (Mo), tungsten (W), niobium (Nb), tantalum (Ta), titanium (Ti), Bismuth (Bi), antimony (Sb), lead (Pb), or the like.

The second insulating layer IL2 may be disposed on the first insulating layer IL1 on which the first conductive layer is provided. The second insulating layer IL2 may include the same material as the first insulating layer IL1, but is not limited thereto.

The second conductive layer may include one layer of the conductive material, or may include a plurality of layers of the conductive material stacked like the first conductive layer. The second conductive layer may include at least one of the first touch electrodes TE1, the second touch electrodes TE2, the first connection pattern CNP1, and the second connection pattern CNP2. In an exemplary embodiment of the present inventive concept, the second conductive layer may include the first touch electrodes TE1, the second touch electrodes TE2, and the second connection pattern CNP2.

The third insulating layer IL3 may be provided on the second insulating layer IL2 on which the second conductive layer is provided. The third insulating layer IL3 prevents the second conductive layer from being exposed to the outside, thereby preventing corrosion of the second conductive layer.

The third insulating layer IL3 may include an organic insulating material. For example, the third insulating layer IL3 may include at least one of acryl, polyimide (PI), polyamide (PA), and benzocyclobutene (BCB). In addition, the third insulating layer IL3 is transparent and has fluidity, so that it is possible to flatten by alleviating unevenness of the underlying structure.

In the present exemplary embodiment, the first connection pattern CNP1 is included in the first conductive layer and the second connection pattern CNP2 is included in the second conductive layer, but the present embodiment is not limited thereto. For example, the second connection pattern CNP2 may be included in the first conductive layer, and the first connection pattern CNP1 may be included in the second conductive layer.

In addition, the first conductive layer is provided on the first insulating layer IL1 and the second conductive layer is provided on the second insulating layer IL2 in the present exemplary embodiment, but the present embodiment is not limited thereto. For example, the first conductive layer may be provided on the second insulating layer IL2, and the second conductive layer may be provided on the first insulating layer IL1.

In addition, the first touch electrodes TE1 and the second touch electrodes TE2 are provided on the same layer in the present exemplary embodiment, but the present embodiment is not limited thereto. For example, the first touch electrodes TE1 and the second touch electrodes TE2 may be provided on different layers.

The second touch electrodes TE2 may include a plurality of conductive fine lines CFL, as shown in FIG. 9. For example, the second touch electrodes TE2 may include a plurality of first conductive fine lines CFL1 extending in the first direction DR1 and parallel to each other, and a plurality of second conductive fine lines CFL2 extending in the second direction DR2 and parallel to each other. The first conductive fine lines CFL1 and the second conductive fine lines CFL2 may form a mesh structure. The mesh structure may include a plurality of openings, for example, regions formed by the crossing of the first conductive fine lines CFL1 and the second conductive fine lines CFL2.

Each of the second touch electrodes TE2 has a mesh structure in the drawing, but the present embodiment is not limited thereto. For example, each of the first touch electrodes TE1, the first connection pattern CNP1, and the second connection pattern CNP2 may include the plurality of conductive fine lines CFL.

When the first touch electrodes TE1 and the second touch electrodes TE2 have a mesh structure, the area in which the first touch electrodes TE1 and the second touch electrodes TE2 overlap the display panel 100 may be reduced due to the openings. When the area in which the first touch electrodes TE1 and the second touch electrodes TE2 overlap the display panel 100 is reduced, the electromagnetic interference between the first touch electrodes TE1 and the second touch electrodes TE1 and the display panel 100 may be prevented. Accordingly, the touch sensitivity of the touch sensor layer 210 may be improved.

The sensing lines SL may include a first sensing line SL1 and a second sensing line SL2. The first sensing line SL1 and the second sensing line SL2 may transmit a change in electrostatic capacitance sensed by the first touch electrodes TE1 and the second touch electrodes TE2 via the pads PD to an external circuit (not shown).

The first sensing line SL1 may be connected to both ends of the first touch electrode rows, but the present embodiment is not limited thereto. For example, the first sensing line SL1 may be connected to only one end of the first touch electrode rows. The second sensing line SL2 may be connected to one end of the second touch electrode columns, but the present embodiment is not limited thereto. For example, the second sensing line SL2 may be connected to both ends of the second touch electrode columns.

The pad unit PD may be provided in the first non-sensing region NSA1 and may include a plurality of pads SL_P. The pads SL_P may be electrically connected to corresponding first touch electrodes TE1 and corresponding second touch electrodes TE2 through the first sensing line SL1 and the second sensing line SL2, respectively.

The touch sensor layer 210 according to an exemplary embodiment of the present inventive concept may further include a ground line GL for supplying a ground voltage GND to each of the first to third sensing regions SA1, SA2, and SA3. The ground line GL may extend from the right vertical portion of the first non-sensing region NSA1 to the right vertical portion of the third non-sensing region NSA3 in the second direction DR2. The ground line GL will be described in detail later.

Meanwhile, the base layer BSL may have a shape corresponding to the substrate SUB of the display panel 100. Therefore, the base layer BSL has a shape in which the second sensing region SA2 and the third sensing region SA3 protrude from the first sensing region SA1 in the second direction DR2 and has a recessed portion between the second sensing region SA2 and the third sensing region SA3. The recessed portion may be the second cutting portion CUT2 that makes the base layer BSL to have a shape corresponding to the substrate SUB of the display panel 100. The second cutting portion CUT2 may correspond to the first cutting portion of the substrate SUB (see CUT1 in FIG. 3). The shape of the second cutting portion CUT2 may be variously changed. For example, as shown in the drawing, the second cutting portion CUT2 may be provided as an open polygon including sides of three straight lines, but is not limited thereto. For example, the second cutting portion CUT2 may be provided in various shapes such as a circle and an ellipse including a side having shape of a curved line, and a semicircle and a semi-ellipse including a side having shape of a straight line and a curved line, and the like. In an exemplary embodiment of the present inventive concept, the sides of the three straight lines of the second cutting portion CUT2 may be a cutting line CL.

In an exemplary embodiment of the present inventive concept, the second sensing region SA2 and the third sensing region SA3 may be spaced apart by a predetermined distance by the second cutting portion CUT2. The additional non-sensing region (ANSA) may be provided in a region between the second sensing region SA2 and the third sensing region SA3 which are spaced apart from each other by the predetermined distance.

The first to third sensing regions SA1, SA2, and SA3 may be different in area and shape from each other. Accordingly, the sizes of the touch electrodes TE disposed in the first to third sensing regions SA1, SA2, and SA3 may not be uniform. Specifically, in the second and third sensing regions SA2 and SA3, the touch electrodes TE adjacent to a cutting line CL of the second cutting portion CUT2 may be partially cut off and removed. For example, as shown in FIG. 6, the first touch electrodes TE1 adjacent to the cutting line CL in the region between the second sensing region SA2 and the third sensing region SA3 may be partially cut off to have a smaller size than the other regions.

The electrostatic capacitance value in the second and third sensing regions SA2 and SA3 including the touch electrodes TE whose portions are removed to correspond to the shape of the second cutting portion CUT2 may be different from the electrostatic capacitance value in the first sensing region SA1 which is not cut off. That is, an electrostatic capacitance value in the second and third sensing regions SA2 and SA3 may be different from an electrostatic capacitance value in the first sensing region SA1.

In addition, the number of the touch electrodes TE disposed in the second sensing region SA2 (hereinafter, referred to as "the second sensing touch electrodes") may be different from the number of the touch electrodes TE disposed in the first sensing region SA1 (hereinafter referred to as "the first sensing touch electrodes"). Similarly, the number of the touch electrodes TE disposed in the third sensing region SA3 (hereinafter, referred to as "the third sensing touch electrodes") may be different from the number of the first sensing touch electrodes disposed in the first sensing region SA1. Since the second sensing region SA2 has a smaller area, particularly a smaller width, than the first sensing region SA1, the second sensing touch electrode TE may be provided in a number less than the first sensing touch electrode TE. In addition, since the third sensing region SA3 also has a smaller width than the first sensing region SA1, the third sensing touch electrode TE may be also provided in a number less than the first sensing touch electrode TE.

The difference in the number of the touch electrodes TE provided in each of the first to third sensing regions SA1, SA2 and SA3 may cause a difference in the load value for each of the first to third sensing regions SA1, SA2, and SA3. The difference in load value for each of the first to third sensing regions SA1, SA2, and SA3 may cause a difference in electrostatic capacitance value for each of the first to third sensing regions SA1, SA2, and SA3. Accordingly, the touch sensor layer 210 may not achieve uniform touch sensitivity.

In an exemplary embodiment of the present inventive concept, in order to compensate for the difference in the load value for each of the first to third sensing regions SA1, SA2, and SA3, a bridge line (not shown), electrically connecting the touch electrodes TE which is partially cut off to have a smaller size in the second and third sensing regions SA2 and SA3, may be provided so that the resistance value between the touch electrodes is different. Such a bridge line will be described later with reference to FIG. 10.

Figure 10:
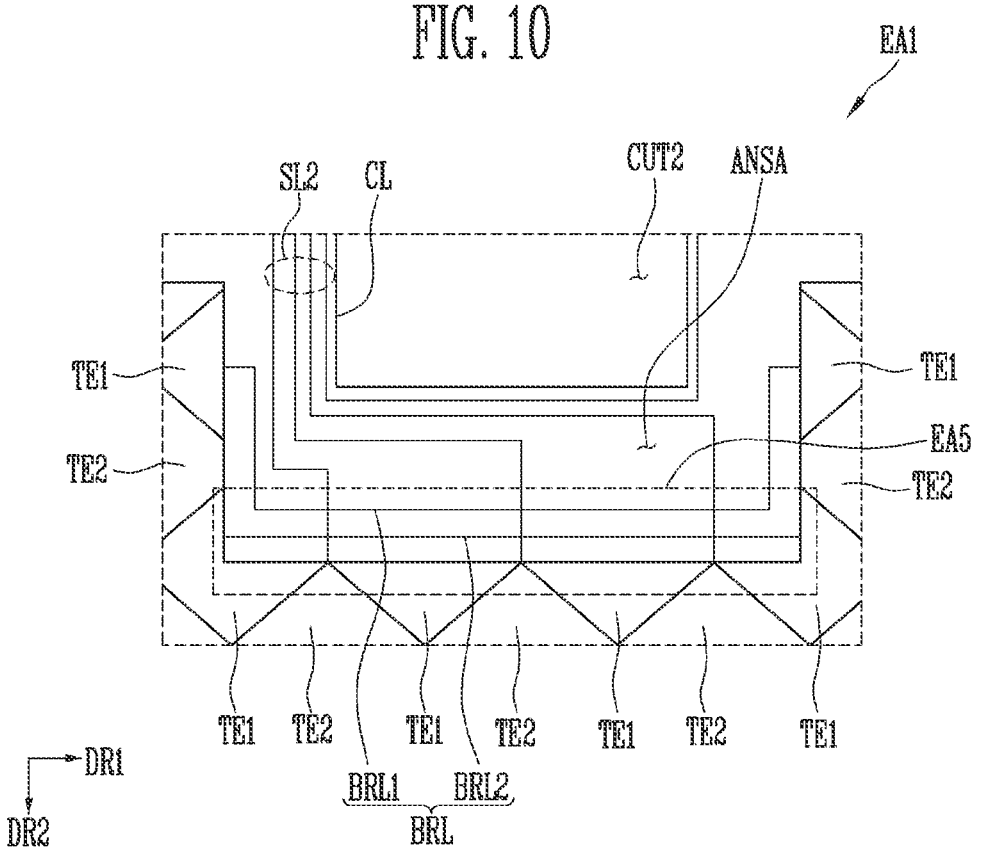
FIG. 10 is an enlarged view of an EA1 region in FIG. 6.
Figure 11:
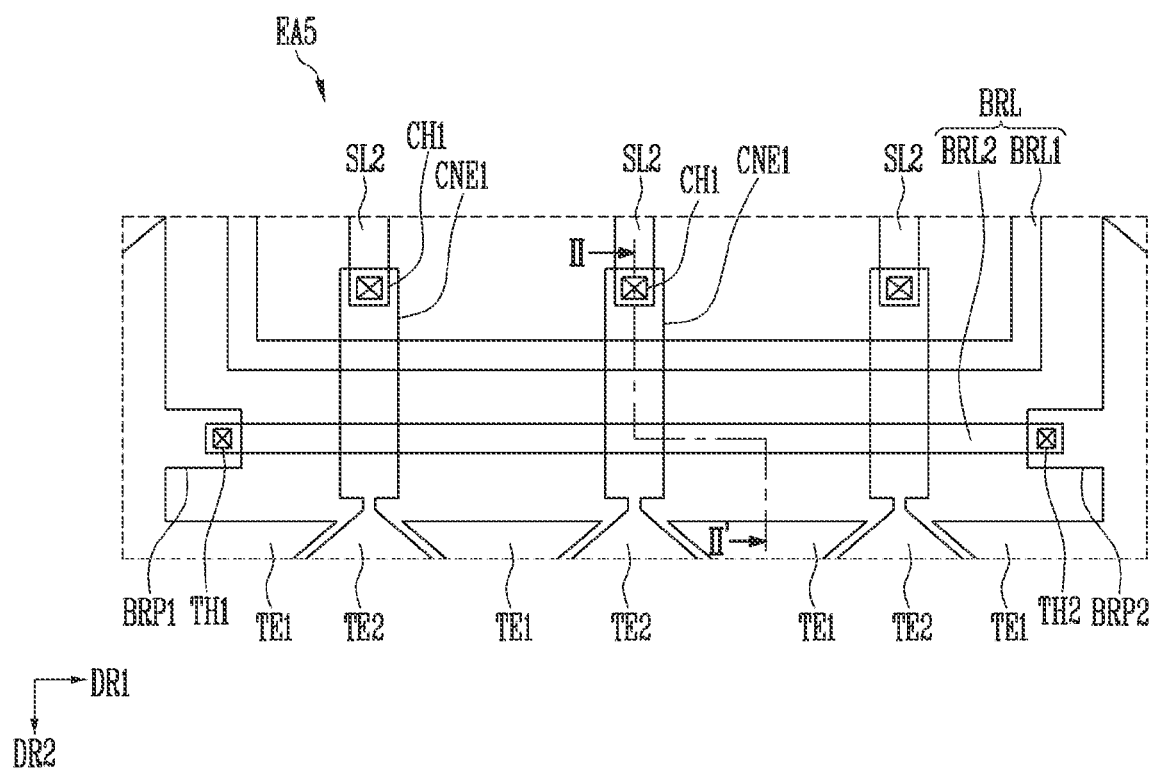
FIG. 11 is an enlarged view of an EA5 region in FIG. 10.
Figure 12:
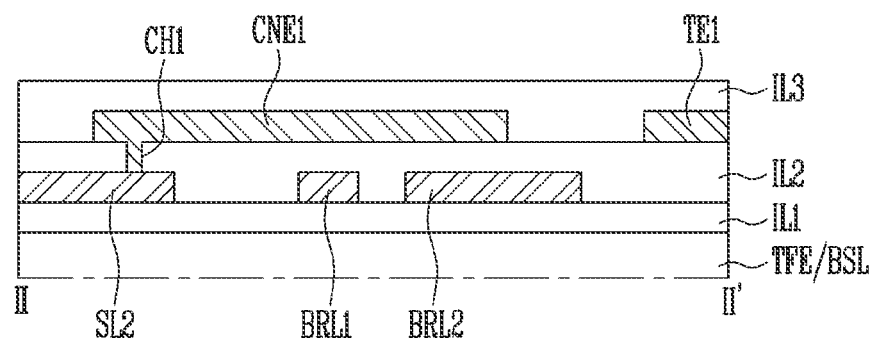
FIG. 12 is a cross-sectional view taken along a line II-II' of FIG. 11.

FIG. 10 is an enlarged view of an EA1 region in FIG. 6, FIG. 11 is an enlarged view of an EA5 region in FIG. 10, and FIG. 12 is a cross-sectional view taken along a line II-II' of FIG. 11.

Referring to FIGS. 6 and 10 to 12, the touch sensor layer 210 according to an exemplary embodiment of the present inventive concept may have a structure in which the resistance values of the touch electrodes TE are different for each sensing region using the bridge line BRL in order to compensate for a difference in load value for each sensing region. To this end, the bridge line BRL may be provided only in the additional non-sensing region ANSA.

The touch sensor layer 210 according to an exemplary embodiment of the present inventive concept may include a base layer BSL, the touch electrodes TE, and sensing lines SL.

The base layer BSL may include the first to third touch regions B1, B2 and B3 and the second cutting portion CUT2 provided between the second touch region B2 and the third touch region B3.

The first touch region B1 may include a first sensing region SA1 and a first non-sensing region NSA1, the second touch region B2 may include a second sensing region SA2 and a second non-sensing region NSA2, and the third touch region B3 may include a third sensing region SA3 and a third non-sensing region NSA3. Each of the first to third sensing regions SA1, SA2, and SA3 may be separated in the base layer BSL and may have a different area, particularly, a different width due to the second cutting portion CUT2.

The touch electrodes TE may be provided in each of the first to third sensing regions SA1, SA2, and SA3. The touch electrodes TE may include a plurality of first touch electrodes TE1 and a plurality of second touch electrodes TE2.

The first touch electrodes TE1 may be arranged in the first direction DR1 and may be electrically connected to form a plurality of touch electrode rows parallel to each other. The second touch electrodes TE2 may be arranged in the second direction DR2 and may be electrically connected to form a plurality of touch electrode columns parallel to each other.

Since each of the second and third sensing regions SA2 and SA3 has an area, particularly a width smaller than the first sensing region SA1, the number of the touch electrodes TE disposed in each of the second and third sensing regions SA2 and SA3 may be less than the number of the touch electrodes TE disposed in the first sensing region SA1. The difference in the number of the touch electrodes TE disposed in the first sensing region SA1 and the number of the touch electrodes TE disposed in each of the second and third sensing regions SA2 and SA3 may cause a load difference in the first to third sensing regions SA1, SA2, and SA3.

In each of the second and third sensing regions SA2 and SA3, the touch electrodes TE adjacent to the cutting line CL of the second cutting portion CUT2 may be partially cut off to be small in size. Particularly, the first touch electrode TE1 which is partially cut off to be small in size may be disposed in each of the second and third sensing regions SA2 and SA3. Accordingly, the sizes of the touch electrodes TE disposed in the first to third sensing regions SA1, SA2, and SA3 may not be uniform. As described above, the difference in the size of the touch electrodes TE disposed in each of the first to third sensing regions SA1, SA2 and SA3 may cause a load difference for each of the first to third sensing regions SA1, SA2, and SA3.

Hereinafter, for convenience of description, the first touch electrode TE1 having a smaller size than the first touch electrode TE1 having a uniform size by being partially removed in the second sensing region SA2, is referred to as the 2-1-th touch electrode TE1, and the first touch electrode TE1 having a smaller size than the first touch electrode TE1 having a uniform size by being partially removed in the third sensing region SA3, is referred to as the 3-1-th touch electrode TE1.

The bridge line BRL for compensating for a difference in load value for each of the first to third sensing regions SA1, SA2, SA3, may be provided in the additional non-sensing region ANSA.

The bridge line BRL may be provided in plurality and electrically connect some of the touch electrodes TE disposed in each of the second and third sensing regions SA2 and SA3. Specifically, the bridge line BRL may electrically connect the 2-1-th touch electrode TE1 and the 3-1-th touch electrode TE1 disposed in the same touch electrode row.

The bridge line BRL may include a first bridge line BRL1 and a second bridge line BRL2. Each of the first and second bridge lines BRL1 and BRL2 may be connected to the 2-1-th touch electrode TE1 and the 3-1-th touch electrode TE1 corresponding thereto through first and second bridge patterns BRP1 and BRP2.

The first bridge line BRL1 may electrically connect the 2-1-th touch electrode TE1 and the 3-1-th touch electrode TE1 of the first touch electrode row disposed at the uppermost location in the base layer BSL. One end of the first bridge line BRL1 may be connected to the 2-1-th touch electrode TE1 of the first touch electrode row through the first bridge pattern BRP1, and the other end thereof may be connected to the 3-1-th touch electrode TE1 of the first touch electrode row through the second bridge pattern BRP2.

The second bridge line BRL2 may electrically connect the 2-1-th touch electrode TE1 and the 3-1-th touch electrode TE1 of the second touch electrode row disposed below the first touch electrode row. One end of the second bridge line BRL2 may be connected to the 2-1-th touch electrode TE1 of the second touch electrode row through the first bridge pattern BRP1, and the other end thereof may be connected to the 3-1-th touch electrode TE1 of the second touch electrodes row through the second bridge pattern BRP2.

One end of the first bridge pattern BRP1 may be connected to a corresponding bridge line BRL through a first through hole TH1 passing through the second insulating layer IL2, and the other end thereof may be directly connected to the 2-1-th touch electrode TE1. In addition, one end of the second bridge pattern BRP2 may be connected to a corresponding bridge line BRL through a second through hole TH2 passing through the second insulating layer IL2, and the other end thereof may be directly connected to the 3-1-th touch electrode TE1.

In an exemplary embodiment of the present inventive concept, the first bridge pattern BRP1 and the second bridge pattern BRP2 may be provided on the same layer. In addition, the first bridge pattern BRP1 may be provided on the same layer as the 2-1-th touch electrode TE1 and may be provided integrally with the 2-1-th touch electrode TE1, and the second bridge pattern BRP2 may be provided on the same layer as the 3-1 touch electrode TE1 and may be provided integrally with the 3-1 touch electrode TE1. As a result, the first bridge pattern BRP1, the second bridge pattern BRP2, the 2-1-th touch electrode TE1, and the 3-1-th touch electrode TE1 may be provided on the same layer and have the same material because they are formed through the same process.

In an exemplary embodiment of the present inventive concept, the bridge line BRL may be provided as a single layer. The bridge line BRL may be provided on the same layer as the sensing line SL and may include the same material as the sensing line SL. For example, the bridge line BRL may be formed of a metal material including molybdenum. Since the bridge line BRL must be disposed within a limited area of the additional non-sensing region ANSA, the bridge line BRL may have a very small line width. In this case, the bridge line BRL may have a low line resistance value due to material characteristics thereof, but the line width is very small and consequently the line resistance value may increase. For example, the line width of the bridge line BRL, BRL1 and BRL2, may be smaller than a line width of the first connection pattern CNP1. Moreover, the line width of the second bridge line BRL2 may be smaller than a line width of the first bridge line BRL1.

When the 2-1-th touch electrode TE1 and the 3-1-th touch electrode TE1 disposed in the same touch electrode row are electrically connected to each other using the bridge line BRL having a large line resistance value, the load value of the touch electrodes TE disposed in each of the second and third sensing regions SA2 and SA3 may increase. As a result, the load value of the touch electrodes TE disposed in each of the second and third sensing regions SA2 and SA3 may be equal to or similar to the load value of the touch electrodes TE disposed in the first sensing region SA1. As described above, when the load values of the touch electrodes TE are the same as or similar to each other in the first to third sensing regions SA1, SA2, and SA3, the touch sensor layer 210 may realize uniform touch sensitivity over the entire region.

The bridge line BRL may overlap the second sensing line SL2 of the sensing lines SL in a plane view. The second sensing line SL2 overlapping the bridge line BRL may be electrically connected to the second touch electrode TE2 disposed in the first sensing region SA1 in the additional non-sensing region ANSA.

In an exemplary embodiment of the present inventive concept, the second sensing line SL2 may be electrically connected to the second touch electrode TE2 by a first contact electrode CNE1. The first contact electrode CNE1 may be formed using the same material and the same process as the second touch electrode TE2 and may be electrically connected to the second touch electrode TE2. One end of the first contact electrode CNE1 may be connected to the second sensing line SL2 through a first contact hole CH1 passing through the second insulating layer IL2, and the other end thereof may be connected to the second touch electrode TE2. Accordingly, the second sensing line SL2 may be electrically connected to the second touch electrode TE2.

In an exemplary embodiment of the present inventive concept, the 2-1-th touch electrode TE1 and the 3-1-th touch electrode TE1 may be provided on the same layer as the second touch electrode TE2. Therefore, the first contact electrode CNE1 may be provided on the same layer as the 2-1-th touch electrode TE1 and the 3-1-th touch electrode TE1.

In an exemplary embodiment of the present inventive concept, the line resistance value of the bridge line BRL may be set differently according to a load value of the touch electrodes TE to be compensated. The line resistance value of the bridge line BRL may be adjusted by adjusting the line width of the bridge line BRL or by forming the bridge line BRL using a conductive material having a high resistance value.

Hereinafter, referring to FIGS. 11 and 12, the bridge line BRL, the touch electrode TE, and the second sensing line SL2 will be described in order of stacking.

First, a first insulating layer IL1 may be provided on the base layer BSL.

The second sensing line SL, the first and second bridge lines BRL1 and BRL2 may be disposed on the first insulating layer IL1.

The second insulating layer IL2 may be disposed on the first insulating layer IL1 on which the second sensing line SL, the bridge line including the first and second bridge lines BRL1 and BRL2, and the like are provided.

The first and second bridge patterns BRP1 and BRP2, the first contact electrode CNE1 and the first and second touch electrodes TE1 and TE2 are disposed on the second insulating layer IL2.

The first contact electrode CNE1 may be electrically connected to the second sensing line SL2 through the first contact hole CH1 passing through the second insulating layer IL2. The first contact electrode CNE1 and the first and second touch electrodes TE1 and TE2 may be provided on the same layer and may include the same material because they are formed using the same process. In an exemplary embodiment of the present inventive concept, the first and second bridge patterns BRP1 and BRP2, the first contact electrode CNE1 and the first and second touch electrodes TE1 and TE2 may include a transparent conductive oxide.

The third insulating layer IL3 may be disposed on the second insulating layer IL2 on which the first contact electrode CNE1 and the like are provided. The third insulating layer IL3 prevents the first contact electrode CNE1 from being exposed to the outside, thereby preventing corrosion of the first contact electrode CNE1.

Figure 13:
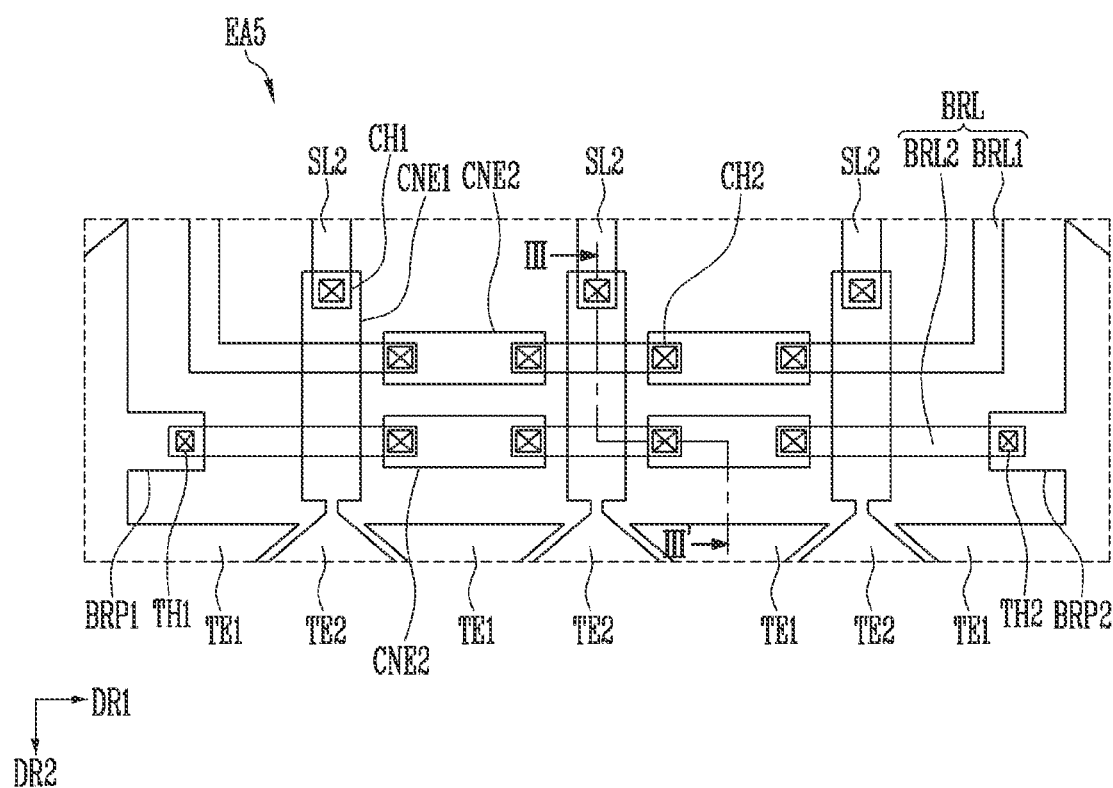
FIG. 13 is a plan view corresponding to an EA5 region of FIG. 10, showing a bridge line according to another exemplary embodiment.
Figure 14:
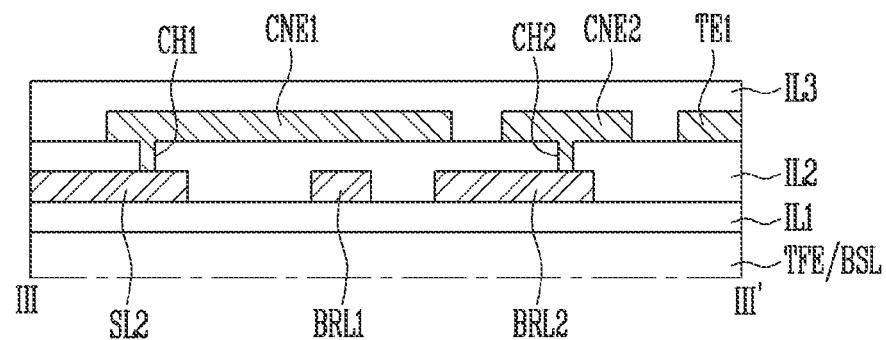
FIG. 14 is a cross-sectional view taken along a line III-III' of FIG. 13.

FIG. 13 is a plan view corresponding to an EA5 region of FIG. 10, showing a bridge line according to another exemplary embodiment, and FIG. 14 is a cross-sectional view taken along a line III-III' of FIG. 13. In another exemplary embodiment of the present inventive concept, it will be described based on different parts from the above exemplary embodiment to avoid a duplicate description. Parts that are not specifically covered in another exemplary embodiment of the present disclosure follows the above exemplary embodiment, and the same reference numerals refer to the same elements and similar reference numerals refer to similar elements.

Referring to FIGS. 10, 13 and 14, the bridge line BRL may include first and second bridge lines BRL1 and BRL2. Each of the first and second bridge lines BRL1 and BRL2 may be electrically connected to the corresponding 2-1-th touch electrode TE1 and the 3-1-th touch electrode TE1 through the first and second bridge patterns BRP1 and BRP2.

The first bridge line BRL1 may electrically connect the 2-1-th touch electrode TE1 of the first touch electrode row disposed at the uppermost location in the base layer (see BSL in FIG. 6) to the 3-1-th touch electrode TE1 thereof. One end of the first bridge line BRL1 may be connected to the 2-1-th touch electrode TE1 of the first touch electrode row through the first bridge pattern BRP1, and the other end thereof may be connected to the 3-1 touch electrode TE1 of the first touch electrode row through the second bridge pattern BRP2.

The second bridge line BRL2 may electrically connect the 2-1-th touch electrode TE1 of the second touch electrode row disposed below the first touch electrode row to the 3-1-th touch electrode TE1 thereof. One end of the second bridge line BRL2 may be connected to the 2-1-th touch electrode TE1 of the second touch electrode row through the first bridge pattern BRP1, and the other end thereof may be connected to the 3-1-th touch electrode TE1 of the second touch electrode row through the second bridge pattern BRP2.

Each of the first and second bridge lines BRL1 and BRL2 may overlap the second contact electrode CNE2 in a plane view. Each of the first and second bridge lines BRL1 and BRL2 may be electrically connected to the second contact electrode CNE2. Specifically, one first bridge line BRL1 may be electrically connected to another first bridge line BRL1 adjacent thereto in the first direction DR1 through the second contact line CNE2. One second bridge line BRL2 may be also electrically connected to another second bridge line BRL2 adjacent thereto in the first direction DR1 through the second contact electrode CNE2.

The second contact electrode CNE2 may be provided on the same layer as the first and second bridge patterns BRP1 and BRP2 and may include the same material as the first and second bridge patterns BRP1 and BRP2. In an exemplary embodiment of the present inventive concept, the second contact electrode CNE2 may be formed of a transparent conductive oxide such as indium tin oxide ITO having a large resistance value and connect adjacent first bridge lines BRL1 and second bridge lines BRL2 through second contact holes. In this case, the line resistance values of the first and second bridge lines BRL1 and BRL2 connected to the second contact electrode CNE2 may increase.

When the 2-1-th touch electrode TE1 and the 3-1-th touch electrode TE1 disposed in the same touch electrode row are electrically connected to each other by using the first and second bridge lines BRL1 and BRL2 having a large line resistance value, the load value of the touch electrodes TE disposed in each of the second and third sensing regions SA2 and SA3 may increase. As a result, the load value of the touch electrodes TE disposed in each of the second and third sensing regions SA2 and SA3 may be equal to or similar to the load value of the touch electrodes TE disposed in the first sensing region SA1.

Hereinafter, referring to FIG. 14, the bridge line BRL, the second contact electrode CNE2, the touch electrode TE, and the second sensing line SL2 will be described in order of stacking.

First, a first insulating layer IL1 may be disposed on the base layer BSL.

The second sensing line SL2, the first and second bridge lines BRL1 and BRL2 may be disposed on the first insulating layer IL1.

The second insulating layer IL2 may be disposed on the first insulating layer IL1 on which the second sensing line SL2, the first and second bridge lines BRL1 and BRL2, and the like are provided.

The first and second bridge patterns BRP1 and BRP2, the second contact electrode CNE2, the first contact electrode CNE1, the 2-1-th touch electrode TE1, and the 3-1-th touch electrode TE1, and the second touch electrode TE2 may be disposed on the second insulating layer IL2.

The second contact electrode CNE2 may be connected to each of the first and second bridge lines BRL1 and BRL2 through a second contact hole CH2 passing through the second insulating layer IL2.

The first contact electrode CNE1 may be electrically connected to the second sensing line SL2 through a first contact hole CH1 passing through the second insulating layer IL2. In an exemplary embodiment of the present inventive concept, the first contact electrode CNE1 may be formed using the same material and the same process as the second touch electrode TE2.

The first bridge pattern BRP1 may be electrically connected to a corresponding bridge line BRL through a first through hole TH1 passing through the second insulation layer IL2. In addition, the first bridge pattern BRP1 may be formed using the same material and the same process as the 2-1-th touch electrode TE1 and may be electrically connected to the 2-1-th touch electrode TE.

The second bridge pattern BRP2 may be electrically connected to the corresponding bridge line BRL through a second through hole TH2 passing through the second insulating layer IL2. In addition, the second bridge pattern BRP2 may be formed using the same material and the same process as the 3-1-th touch electrode TE1 and may be electrically connected to the 3-1-th touch electrode TE1.

The third insulating layer IL3 may be provided on the second insulating layer IL2 on which the first and second contact electrodes CNE1 and CNE2, and the like are provided.

In an exemplary embodiment of the present inventive concept, the second contact electrode CNE2 partially overlaps the corresponding bridge line BRL, but the present embodiment is not limited thereto. For example, the second contact electrode CNE2 may overlap most of the corresponding bridge lines BRL within a range in which a line resistance value of the bridge line BRL can increase while ensuring electrical insulation with the first contact electrode CNE1.

Figure 15:
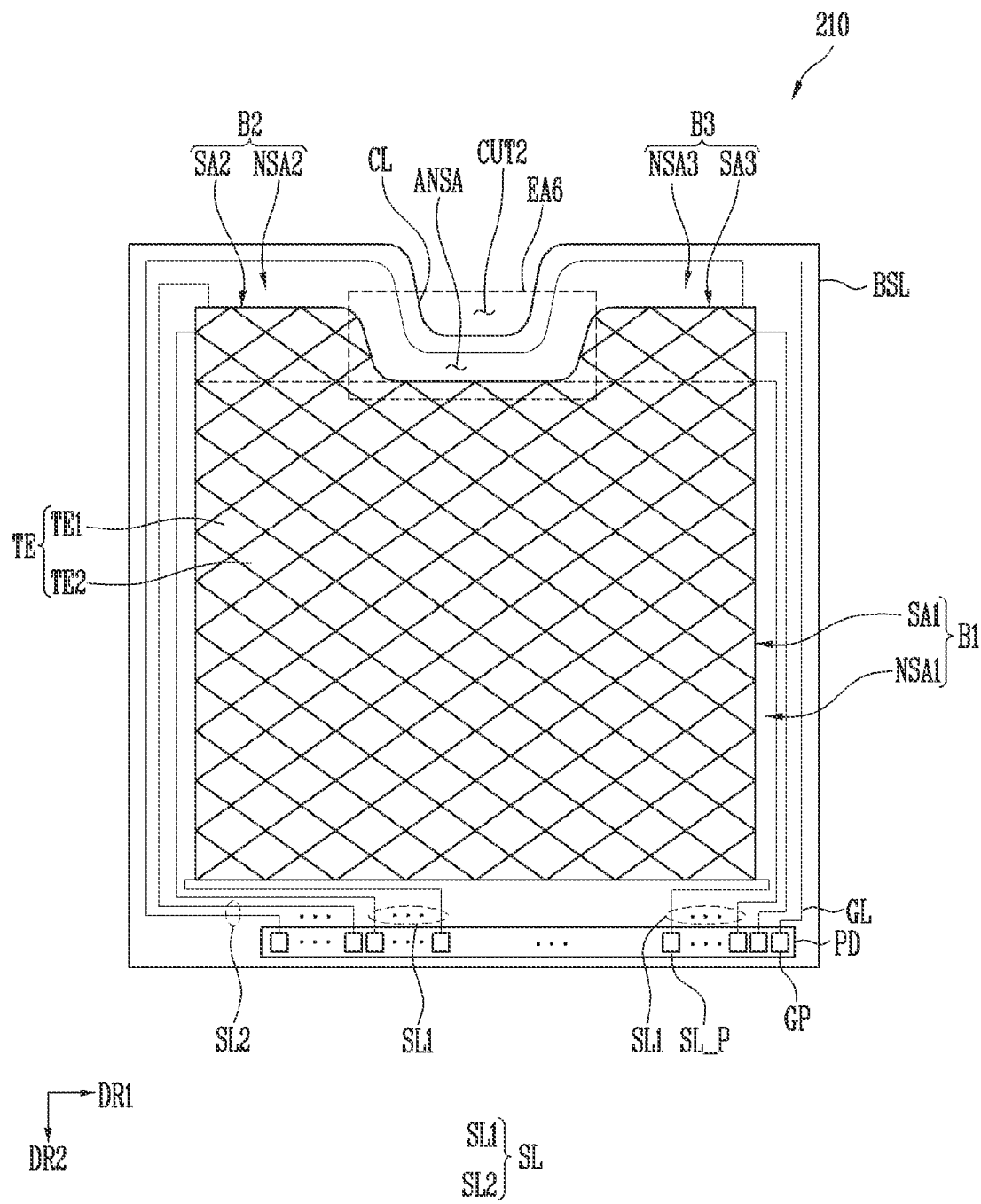
FIG. 15 is a plan view for illustrating a touch sensor layer according to another exemplary embodiment of the present inventive concept.
Figure 16:
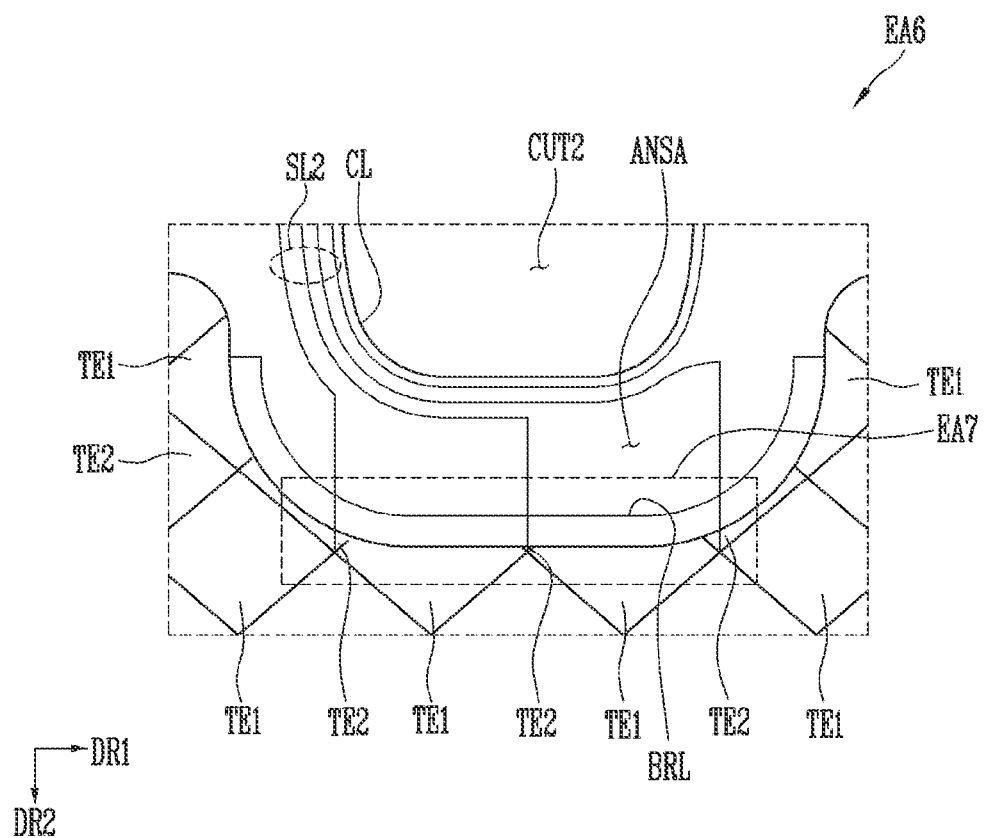
FIG. 16 is an enlarged view of an EA6 region in FIG. 15.
Figure 17:
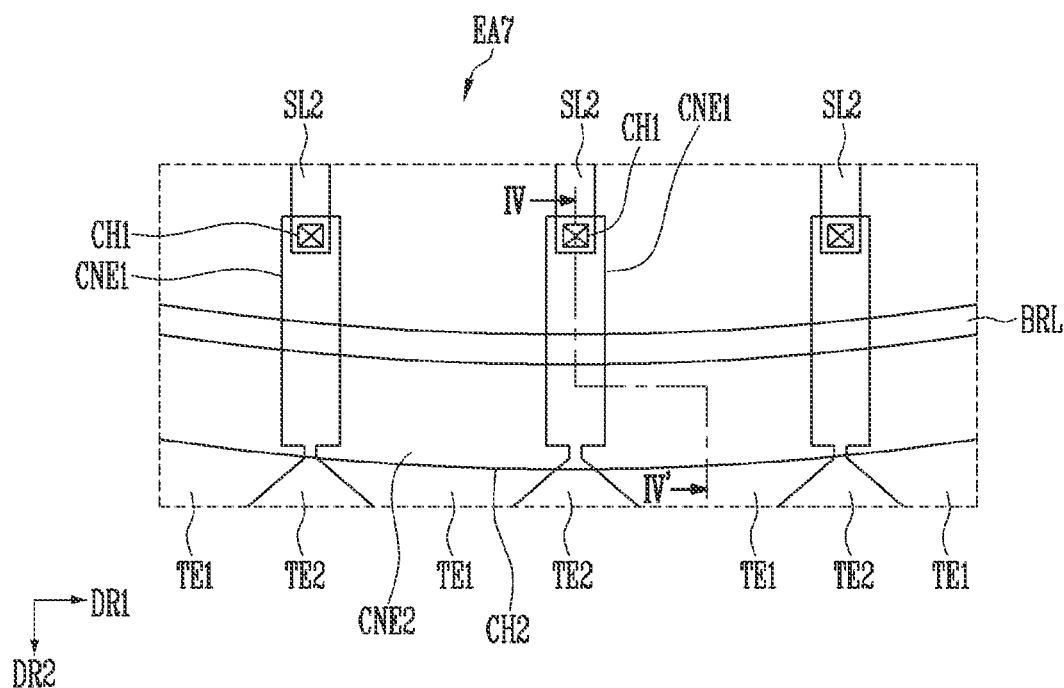
FIG. 17 is an enlarged view of an EA7 region in FIG. 16.
Figure 18:
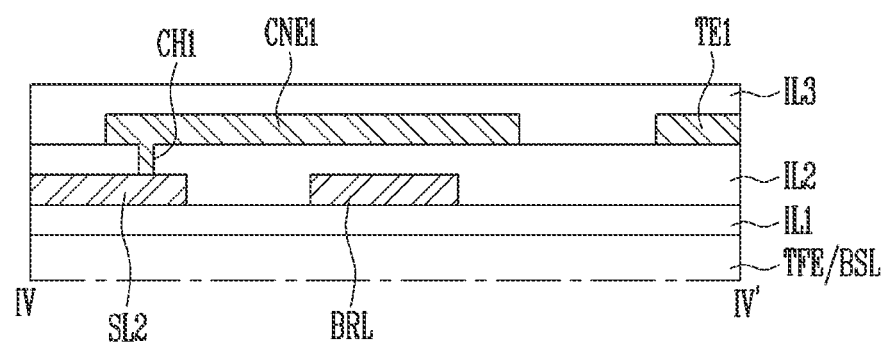
FIG. 18 is a cross-sectional view taken along a line IV-IV' of FIG. 17.

FIG. 15 is a plan view for illustrating a touch sensor layer according to another exemplary embodiment of the present inventive concept, FIG. 16 is an enlarged view of an EA6 region in FIG. 15, FIG. 17 is an enlarged view of an EA7 region in FIG. 16, and FIG. 18 is a cross-sectional view taken along a line IV-IV' of FIG. 17. In another exemplary embodiment of the present inventive concept, it will be described based on different parts from the above exemplary embodiment to avoid a duplicate description. Parts that are not specifically covered in another exemplary embodiment of the present disclosure follows the above exemplary embodiment, and the same reference numerals refer to the same elements and similar reference numerals refer to similar elements.

Referring to FIGS. 15 to 18, the touch sensor layer 210 according to another exemplary embodiment of the present inventive concept may include a base layer BSL having the first to third touch regions B1, B2, and B3 having different areas. The base layer BSL may be provided in substantially the same shape as the substrate (see SUB in FIG. 3) of the display panel (see 100 in FIG. 3).

The first touch region B1 may include a first sensing region SA1 and second sensing region SA2 and a second non-sensing region NSA2, and the third touch region B3 may include a third sensing region SA3 and a third non-sensing region NSA3.

Each of the first to third touch regions B1, B2, and B3 may have various shapes. The base layer BSL has a shape in which the second sensing region SA2 and the third sensing region SA3 protrude from the first sensing region SA1 in the second direction DR2 and has a recessed portion between the second sensing region SA2 and the third sensing region SA3 recesses.

The recessed portion may be the second cutting portion CUT2 that makes the base layer BSL to have a shape corresponding to the substrate SUB. The second cutting portion CUT2 may be provided in an open round shape including three adjacent sides. The three sides of the second cutting portion CUT2 may be curved sides having a predetermined curvature. The three sides of the second cutting portion CUT2 may be a cutting line CL.

In an exemplary embodiment of the present inventive concept, a portion of the edges of each of the second and third sensing regions SA2 and SA3 may include curved sides having a predetermined curvature corresponding to the cutting line CL. In particular, the edges of each of the second and third sensing regions SA2 and SA3 adjacent to the additional non-sensing region ANSA of the base layer BSL may include curved sides.

The second sensing region SA2 and the third sensing region SA3 may be spaced apart by a predetermined distance due to the second cutting portion CUT2. The additional non-sensing region (ANSA) may be provided in a region between the second sensing region SA2 and the third sensing region SA3 which are spaced apart from each other by the predetermined distance. The additional non-sensing region ANSA may have a round shape corresponding to the curved side of the second and third sensing regions SA2 and SA3.

Touch electrodes TE may be provided in each of the first to third sensing regions SA1, SA2, and SA3. The touch electrodes TE may include a plurality of first touch electrodes TE1 and a plurality of second touch electrodes TE2.

In each of the second and third sensing regions SA2 and SA3, the touch electrodes TE adjacent to the cutting line CL of the second cutting portion CUT2 may be partially cut off to have a smaller size than the other regions. Particularly, the first touch electrode TE1 which is partially cut off to have a smaller size may be disposed in each of the second and third sensing regions SA2 and SA3. Hereinafter, for convenience of description, the first touch electrode TE1 having a smaller size than the first touch electrode TE1 having a uniform size by being partially removed in the second sensing region SA2, is referred to as the 2-1-th touch electrode TE1, and the first touch electrode TE1 having a smaller size than the first touch electrode TE1 having a uniform size by being partially removed in the third sensing region SA3, is referred to as the 3-1-th touch electrode TE1.

The bridge line BRL for compensating for a difference in load value for each of the first to third sensing regions SA1, SA2, SA3, may be provided in the additional non-sensing region ANSA. In an exemplary embodiment of the present inventive concept, the bridge line BRL may be a curvedline having a predetermined curvature corresponding to the round shape of the additional non-sensing region ANSA.

The bridge line BRL may electrically connect the 2-1-th touch electrode TE1 and the 3-1-th touch electrode TE1 disposed in the same touch electrode row. In an exemplary embodiment of the present inventive concept, the bridge line BRL may be provided as a single layer or a multilayer. The bridge line BRL may be provided on the same layer as the sensing line SL, may include the same material as the sensing line SL and may be formed by the same process as the sensing line SL. Since the bridge line BRL must be disposed within a limited area of the additional non-sensing region ANSA, the bridge line BRL may have a very small line width. In this case, the line resistance value of the bridge line BRL may increase.

When the 2-1-th touch electrode TE1 and the 3-1-th touch electrode TE1 disposed in the same touch electrode row are electrically connected to each other using the bridge line BRL having a large line resistance value, the load value of the touch electrodes TE disposed in each of the second and third sensing regions SA2 and SA3 may increase. As a result, the load value of the touch electrodes TE disposed in each of the second and third sensing regions SA2 and SA3 may be equal to or similar to the load value of the touch electrodes TE disposed in the first sensing region SA1.

The bridge line BRL may overlap the second sensing line SL2 of the sensing lines SL in a plane view. The second sensing line SL2 overlapping the bridge line BRL may be electrically connected to the second touch electrode TE2 disposed in the first sensing region SA1. In an exemplary embodiment of the present inventive concept, the second sensing line SL2 may be electrically connected to the second touch electrode TE2 by a first contact electrode CNE1. The first contact electrode CNE1 may be formed by the same material and the same process as the second touch electrode TE2 and may be electrically connected to the second touch electrode TE2.

Figure 19:
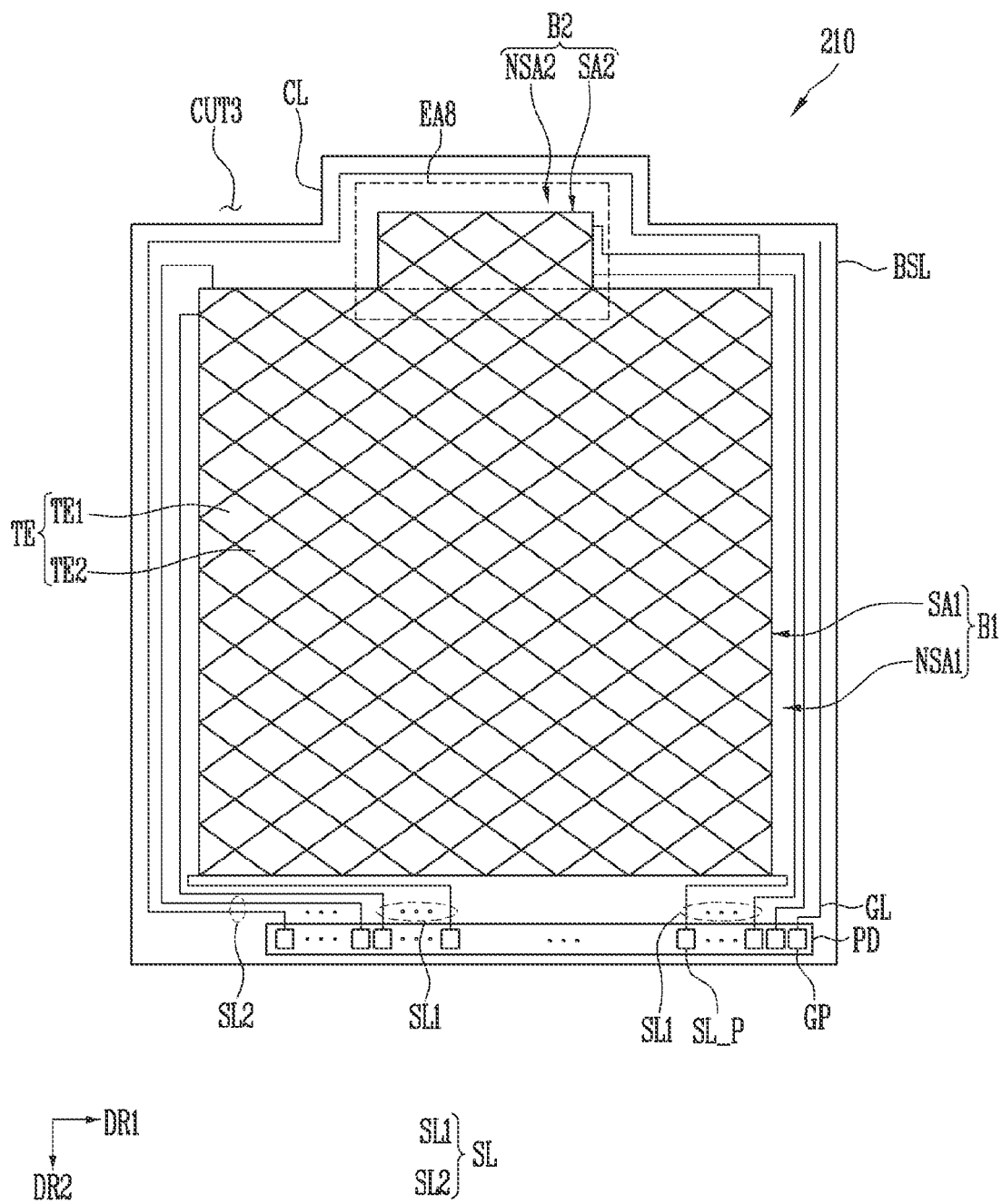
FIG. 19 is a plan view for illustrating a touch sensor layer according to another exemplary embodiment of the present inventive concept.
Figure 20:
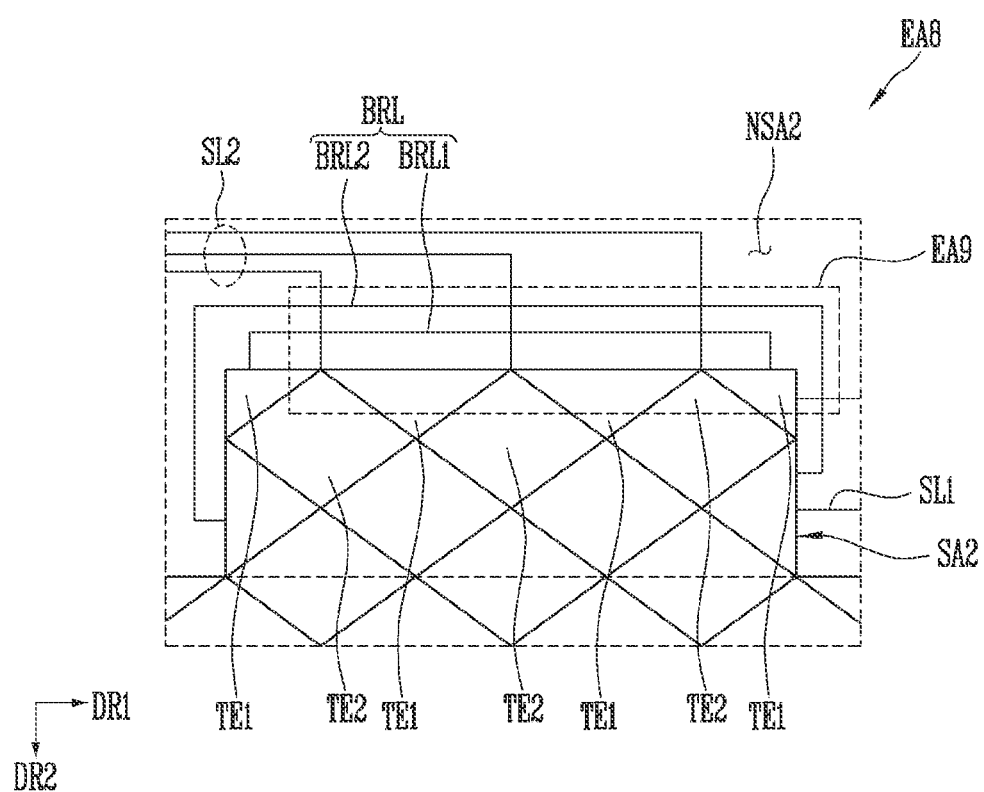
FIG. 20 is an enlarged view of an EA8 region in FIG. 19.
Figure 21:
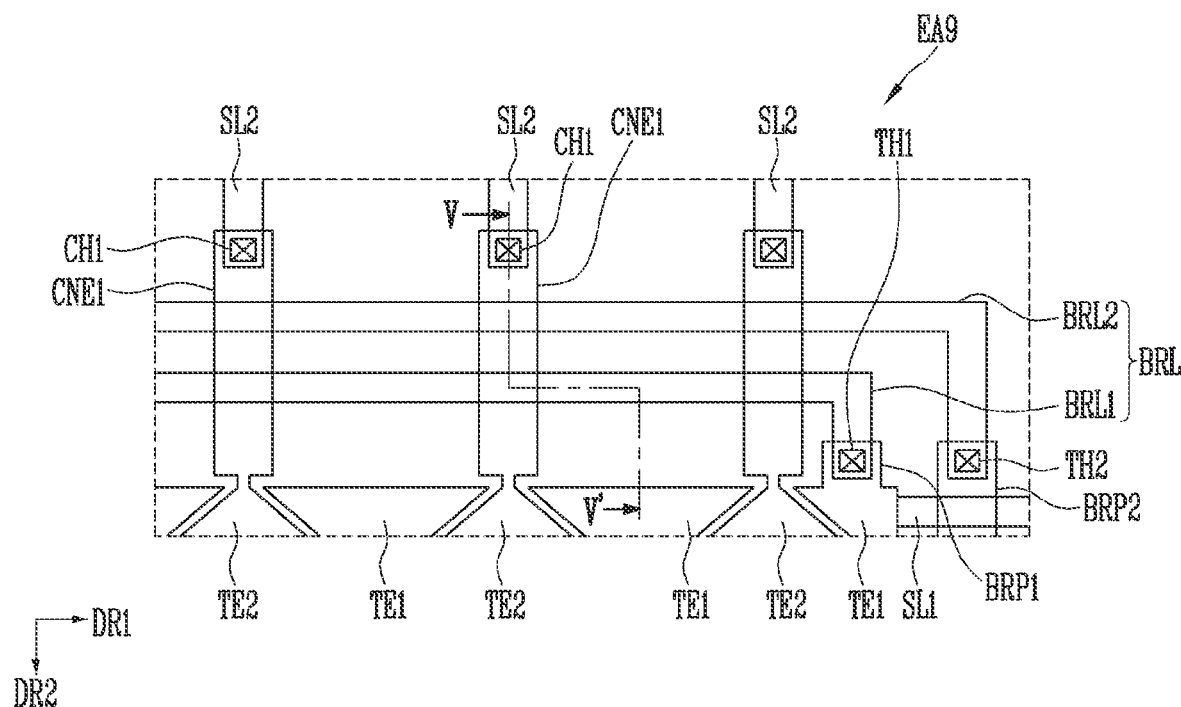
FIG. 21 is an enlarged view of an EA9 region in FIG. 20.
Figure 22:
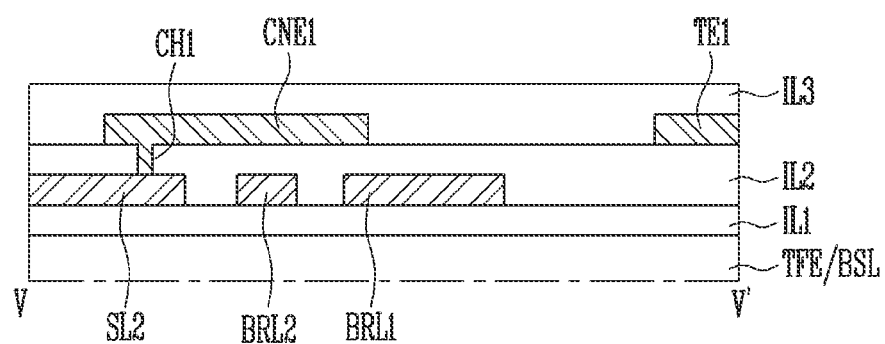
FIG. 22 is a cross-sectional view taken along a line V-V' of FIG. 21.

FIG. 19 is a plan view for illustrating a touch sensor layer according to another exemplary embodiment of the present inventive concept, FIG. 20 is an enlarged view of an EA8 region in FIG. 19, FIG. 21 is an enlarged view of an EA9 region in FIG. 20, and FIG. 22 is a cross-sectional view taken along a line V-V' of FIG. 21. In another exemplary embodiment of the present inventive concept, it will be described based on different parts from the above exemplary embodiment to avoid a duplicate description. Parts that are not specifically covered in another exemplary embodiment of the present disclosure follows the above exemplary embodiment, and the same reference numerals refer to the same elements and similar reference numerals refer to similar elements.

Referring to FIGS. 19 to 22, the touch sensor layer 210 according to another exemplary embodiment of the present inventive concept may include a base layer BSL having the first and second touch regions B1 and B2 having different areas.

Each of the first and second touch regions B1 and B2 may have various shapes, but may have a substantially rectangular shape as shown in the drawing. Specifically, the base layer BSL may have a shape in which the second touch region B2 is protruded from a central portion of the first touch region B1 in the second direction DR2. Therefore, the base layer BSL may include a third cutting portion CUT3, which is partially removed at both ends of the second touch region B2. The third cutting portion CUT3 may be an region removed from the base layer BSL so that the base layer BSL corresponds to the shape of the display panel 100 (see FIG. 1).

The first touch region B1 may include a first sensing region SA1 and a first non-sensing region NSA1, and the second touch region B2 may include a second sensing region SA2 and a second non-sensing region NSA2.

A plurality of touch electrodes TE may be provided in the first sensing region SA1 and the second sensing region SA2. The touch electrodes TE may include a plurality of first touch electrodes TE1 and a plurality of second touch electrodes TE2. The first touch electrodes TE1 may be arranged in the first direction DR1 and may be electrically connected to form a plurality of touch electrode rows parallel to each other. The second touch electrodes TE2 may be arranged in the second direction DR2 and may be electrically connected to form a plurality of touch electrode columns parallel to each other.

Since the second sensing regions SA2 has an area, particularly a width smaller than the first sensing region SA1, the number of the touch electrodes TE disposed in the second sensing regions SA2 may be less than the number of the touch electrodes TE disposed in the first sensing region SA1. The difference in the number of the touch electrodes TE disposed in the first sensing region SA1 and the number of the touch electrodes TE disposed in the second sensing regions SA2 may cause a load difference for the first and second sensing regions SA1 and SA2.

In the second sensing regions SA2, the touch electrodes TE adjacent to the cutting line CL of the third cutting portion CUT3 may be partially cut off to be removed. Particularly, the first touch electrode TE1 which is partially cut off to have a smaller size than the other region may be disposed in the second sensing regions SA2. Accordingly, the sizes of the touch electrodes TE disposed in each of the first and second sensing regions SA1 and SA2 may not be uniform. As described above, the difference in the size of the touch electrodes TE disposed in each of the first and second sensing regions SA1 and SA2 may cause a load difference for each of the first and second sensing regions SA1 and SA2.

The bridge line BRL for compensating for a difference in load value for each of the first and second sensing regions SA1 and SA2 may be provided in the second non-sensing region NSA2. For convenience of description, the first touch electrode TE1 having a smaller size than the first touch electrode TE1 having a uniform size by being partially removed in the second sensing region SA2, is referred to as the 2-1-th touch electrode TE1.

The bridge line BRL may be provided in plurality and may electrically connect the 2-1-th touch electrodes TE1 disposed in the same touch electrode row. The bridge line BRL may include a first bridge line BRL1 and a second bridge line BRL2.

The first bridge line BRL1 may electrically connect the 2-1-th touch electrodes TE1 adjacent to each other in the first touch electrode row disposed at the uppermost location in the base layer BSL. The first bridge line BRL1 may be electrically connected to the 2-1-th touch electrodes TE1 adjacent to each other in the first touch electrode row by the first bridge pattern BRP1. In an exemplary embodiment of the present inventive concept, the first bridge pattern BRP1 may be provided on the same layer as the 2-1-th touch electrode TE1 and may include the same material as the 2-1-th touch electrode TE1.

The second bridge line BRL2 may electrically connect the 2-1-th touch electrodes TE1 adjacent to each other in the second touch electrode row disposed below the first touch electrode row. The second bridge line BRL2 may be electrically connected to the 2-1-th touch electrodes µl adjacent to each other in the second touch electrode row by the second bridge pattern BRP2.

The first and second bridge lines BRL1 and BRL2 may be spaced apart by a predetermined distance in the second non-sensing region NSA2. Each of the first and second bridge lines BRL1 and BRL2 may be provided as a single layer or a multilayer. Each of the first and second bridge lines BRL1 and BRL2 may be provided on the same layer as the sensing line SL and may include the same material as the sensing line SL. Since each of the first and second bridge line BRL1 and BRL2 must be disposed within a limited area of the second non-sensing region NSA2, each of the first and second bridge line BRL1 and BRL2 may have a very small line width. In this case, the line width of each of the first and second bridge line BRL1 and BRL2 may be very small, and thus the line resistance value thereof may increase.

When the 2-1-th touch electrodes TE1 adjacent to each other in the same touch electrode row are electrically connected to each other by using the first and second bridge line BRL1 and BRL2 having a large line resistance value, the load value of the touch electrodes TE disposed in the second sensing regions SA2 may increase. As a result, the load value of the touch electrodes TE disposed in the second sensing regions SA2 may be equal to or similar to the load value of the touch electrodes TE disposed in the first sensing region SA1. As described above, when the load values of the touch electrodes TE are the same as or similar to each of the first and second sensing regions SA1 and SA2, the touch sensor layer 210 may realize uniform touch sensitivity over the entire region.

The bridge line BRL may overlap the second sensing line SL2 of the sensing lines SL in a plane view. The second sensing line SL2 overlapping the bridge line BRL may be electrically connected to the second touch electrode TE2 disposed in the second sensing region SA2.

The second sensing line SL2 may be electrically connected to the second touch electrode TE2 by a first contact electrode CNE1. The first contact electrode CNE1 may be formed by the same material and the same process as the second touch electrode TE2. In addition, the first contact electrode CNE1 may be provided on the same layer as the first and second bridge patterns BRP1 and BRP2 and may include the same material as the first and second bridge patterns BRP1 and BRP2.

Figure 23:
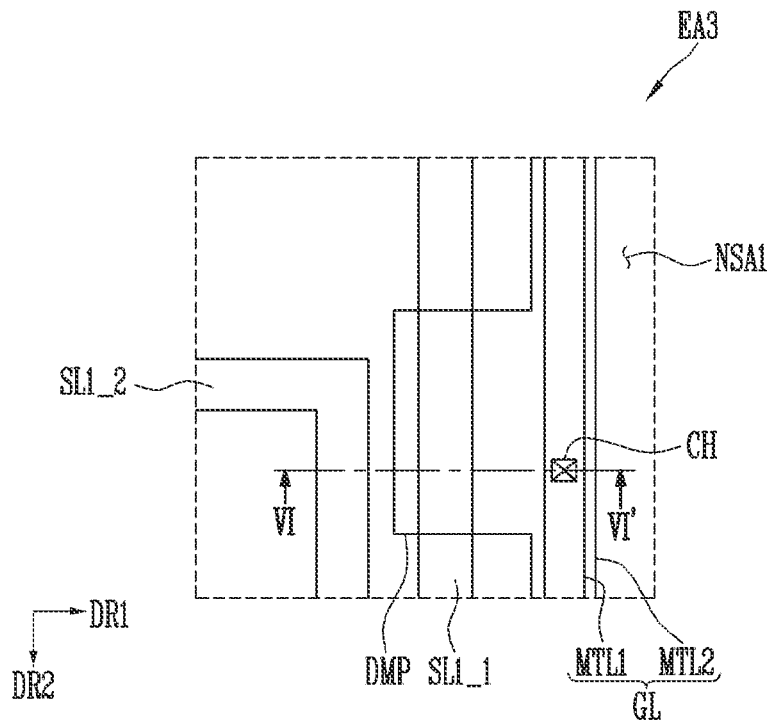
FIG. 23 is an enlarged view of an EA3 region in FIG. 6.
Figure 24:
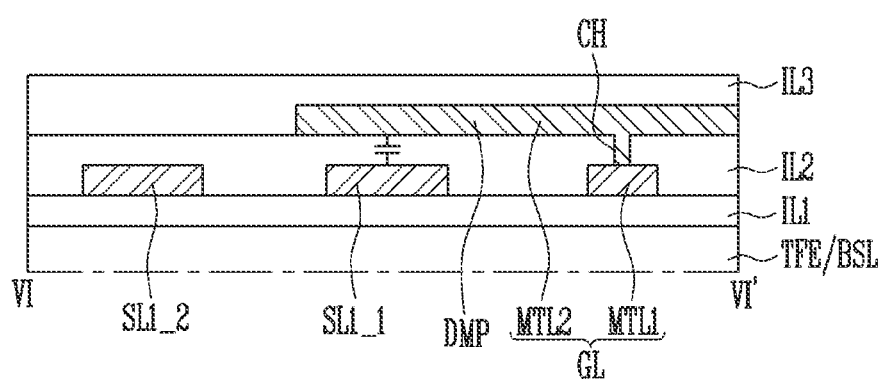
FIG. 24 is a cross-sectional view taken along a line VI-VI' of FIG. 23.

FIG. 23 is an enlarged view of an EA3 region in FIG. 6, and FIG. 24 is a cross-sectional view taken along a line VI-VI' of FIG. 23.

Referring to FIGS. 6, 23 and 24, the touch sensor layer 210 according to an exemplary embodiment of the present inventive concept may include a base layer BSL including the first to third touch regions B1, B2, and B3 having different areas from each other due to a second cutting portion CUT2.

The first touch region B1 may include a first sensing region SA1 and second sensing region SA2 and a second non-sensing region NSA2, and the third touch region B3 may include a third sensing region SA3 and a third non-sensing region NSA3.

The touch sensor layer 210 may include a ground line GL for supplying a ground voltage GND to each of the first to third sensing regions SA1, SA2, and SA3.

The ground line GL may extend from one vertical portion of the first non-sensing region NSA1 to one vertical portion of the third non-sensing region NSA3 in the second direction DR2. The ground line GL may include a first metal layer MTL1 and a second metal layer MTL2 provided on the first metal layer MTL1 with a second insulating layer IL2 interposed therebetween. The first metal layer MTL1 and the second metal layer MTL2 may be electrically connected through a contact hole CH passing through the second insulating layer IL2. The first metal layer MTL1 may be electrically connected to a ground pad GP of a plurality of pads provided in the pad unit PD. The ground line GL may provide the ground voltage GND from the power supply (not shown) to the first to third sensing regions SA1, SA2, and SA3 through the ground pad GP.

In an exemplary embodiment of the present inventive concept, the ground line GL may include a dummy portion DMP for compensating the difference in the load value of the touch electrode TE in each of the first to third sensing regions SA1, SA2, and SA3. The dummy portion DMP may be formed by the same material and the same process as the second metal layer MTL2. Therefore, a power equal to the ground voltage GND may be applied to the dummy portion DMP.

The dummy portion DMP may include a horizontal portion extending in the first direction DR1 and a vertical portion extending in the second direction DR2 crossing the first direction DR1 in a plane view.

The dummy portion DMP may overlap a portion of the first sensing line SL1 of the sensing lines SL disposed on the base layer BSL. In an exemplary embodiment of the present inventive concept, the portion of the first sensing line SL1 overlapping the dummy portion DMP may include the 1-1-th sensing line SL1_1 electrically connecting the first touch electrode row disposed at the uppermost side of the second and third sensing regions SA2 and SA3 to the pad unit PD.

A plurality of first touch electrodes TE1 may be disposed in the first touch electrode row. Some of the first touch electrodes TE1 disposed in the first touch electrode row may include a first touch electrode TE1 having a small size by being partially cut off to correspond to the second cutting portion CUT2 in the region between the second sensing region SA2 and the third sensing region SA3. The dummy portion DMP may overlap the 1-1-th sensing line SL1_1 connected to the first touch electrode row including the first touch electrode TE1 having no uniform size.

The 1-1-th sensing line SL1_1 may transmit a touch sensing signal from the first touch electrodes TE1 disposed in the first touch electrode row to an external circuit (not shown). That is, a power higher than a predetermined level may be applied to the 1-1-th sensing line SL1_1.

Accordingly, the dummy portion DMP may overlap the 1-1-th sensing line SL1_1 with the second insulation layer IL2 interposed therebetween to form a parasitic capacitor. The parasitic capacitance of the parasitic capacitor may increase the load value of the touch electrodes TE in each of the second and third sensing regions SA2 and SA3. As a result, the load value of the touch electrodes TE disposed in each of the second and third sensing regions SA2 and SA3 may be equal to or similar to the load value of the touch electrodes TE disposed in the first sensing region SA1. As described above, when the load values of the touch electrodes TE are the same as or similar to each of the first to third sensing regions SA1, SA2, and SA3, the touch sensor layer 210 may realize uniform touch sensitivity over the entire region.

In an exemplary embodiment of the present inventive concept, the dummy portion DMP may be provided in various shapes within a range in which the parasitic capacitance can increase by enlarging the overlapping area with the 1-1-th sensing line SL1_1.

In an exemplary embodiment of the present inventive concept, the dummy portion DMP overlaps only the 1-1-th sensing line SL1_1, but the present embodiment is not limited thereto. For example, the dummy portion DMP may overlap a plurality of first sensing lines connected to the touch electrode row including the first touch electrodes TE1 having no uniform size in the second and third sensing regions SA2 and SA3.

Hereinafter, referring to FIG. 24, the dummy portion DMP and the first sensing line SL1 will be described in the order of stacking.

First, a first insulating layer IL1 may be provided on the base layer BSL.

The 1-1-th sensing line SL1_1, the 1-2-th sensing line SL1_2, and the first metal layer MTL1 may be disposed on the first insulating layer IL1.

The second insulating layer IL2 may be disposed on the first insulating layer IL1 on which the 1-1-th sensing line SL1_1, the 1-2-th sensing line SL1_2 and the like are provided.

The second metal layer MTL2 and the dummy portion DMP may be disposed on the second insulating layer IL2. The second metal layer MTL2 and the dummy portion DMP may be formed by the same material and the same process. The second metal layer MTL2 may be electrically connected to the first metal layer MTL1 through the contact hole CH passing through the second insulating layer IL2. The second metal layer MLT may include a transparent conductive oxide and may be provided on the same layer as the first touch electrode TE1.

The third insulating layer IL3 may be disposed on the second insulating layer IL2 on which the second metal layer MTL2 and the dummy portion DMP are provided. The third insulating layer IL3 prevents the second metal layer MTL2 and the dummy portion DMP from being exposed to the outside, thereby preventing corrosion of the second metal layer MTL2 and the dummy portion DMP.

The display device according to an exemplary embodiment of the present inventive concept may be applied to various electronic devices. For example, the display device may be applied to a television, a notebook, a mobile phone, a smart phone, a smart pad, a PMP, a PDA, a navigation device, various wearable devices such as a smart watch, and the like.

While the present inventive concept has been shown and described with reference to certain exemplary embodiments thereof, it will be understood by those skilled in the art that various changes in forms and details may be made therein without departing from the spirit and scope of the present inventive concept as defined by the appended claims and their equivalents.

Accordingly, the technical scope of the present disclosure may be determined by on the technical scope of the accompanying claims.

What is claimed is:

1. A touch sensor, comprising:
a base layer having a first sensing region, a second sensing region directly connected to a first portion of the first sensing region, a third sensing region separated from the second sensing region and directly connected to a second portion of the first sensing region, and a non-sensing region surrounding the first sensing region;
a plurality of touch electrode rows provided in each of the first sensing region, the second sensing region, and the third sensing region, the plurality of touch electrode rows including a plurality of first touch electrodes connected in a first direction;
a plurality of touch electrode columns provided in each of the first sensing region, the second sensing region, and the third sensing region, the plurality of touch electrode columns including a plurality of second touch electrodes connected in a second direction different from the first direction;
a plurality of first sensing lines provided in the non-sensing region and electrically connected to the plurality of touch electrode rows;
a plurality of second sensing lines provided in the non-sensing region and electrically connected to the plurality of touch electrode columns;
a first contact electrode provided in the non-sensing region, electrically insulated from at least one of the first touch electrodes, and electrically connecting at least one of the touch electrode columns and at least one of the second sensing lines; and
a bridge line provided in the non-sensing region and overlapping and intersecting the first contact electrode, and
wherein a portion of edges of each of the second sensing region and the third sensing region includes a curved side.

2. The touch sensor of claim 1, wherein a width of each of the second sensing region and the third sensing region increases in the second direction.

3. The touch sensor of claim 1, wherein each of the second sensing region and the third sensing region has a smaller area than the first sensing region.

4. The touch sensor of claim 1, wherein the base layer has a shape in which the second sensing region and the third sensing region protrude from the first sensing region in the second direction, and has a recessed portion between the second sensing region and the third sensing region.

5. The touch sensor of claim 4, wherein the recessed portion has an open round shape including three adjacent sides.

6. The touch sensor of claim 1, wherein:
the non-sensing region includes an additional non-sensing region disposed between the second sensing region and the third sensing region, and
the additional non-sensing region has a round shape corresponding to the curved side of the second sensing region and the third sensing region.

7. The touch sensor of claim 6, wherein the first contact electrode and the bridge line are disposed in the additional non-sensing region.

8. The touch sensor of claim 6, wherein the bridge line is a curved line having a predetermined curvature corresponding to the round shape of the additional non-sensing region.

9. The touch sensor of claim 6, wherein at least one of the plurality of second sensing lines includes a curved line having a predetermined curvature corresponding to the round shape of the additional non-sensing region.

10. The touch sensor of claim 6, wherein, in each of the second sensing region and the third sensing region, first touch electrodes adjacent to the additional non-sensing region have a smaller size than first touch electrodes adjacent to the first sensing region.

11. The touch sensor of claim 1, wherein:
the bridge line electrically connects at least one of the plurality of first touch electrodes of the second sensing region and at least one of the plurality of first touch electrodes of the third sensing region, and
the at least one of the plurality of first touch electrodes of the second sensing region and the at least one of the plurality of first touch electrodes of the third sensing region are provided in the same touch electrode row.

12. The touch senor of claim 1, further comprising:
an insulating layer disposed on the base layer and having at least one or more contact holes,
wherein:
the bridge line is disposed on the base layer and the first contact electrode is disposed on the insulating layer, and
the bridge line is provided on the same layer as the first sensing lines and the second sensing lines.

13. The touch sensor of claim 12, further comprising:
a ground line provided in the non-sensing region and transmitting a ground voltage to the first to third sensing regions,
wherein the ground line includes a dummy portion overlapping at least one of the first sensing lines.

14. The touch sensor of claim 13, wherein the ground line includes:
a first metal layer disposed on the base layer; and
a second metal layer disposed on the first metal layer with the insulating layer interposed therebetween,
wherein:
the second metal layer is formed by the same material and the same process as the dummy portion, and
the dummy portion is provided on the same layer as the plurality of first touch electrodes provided in each of the second sensing region and the third sensing region.

15. The touch sensor of claim 1, wherein the first contact electrode is provided on the same layer as the second touch electrodes of at least one of the touch electrode columns.

16. A display device, comprising:
a display panel; and
a touch sensor disposed on the display panel,
wherein the touch sensor includes:
a base layer having a first sensing region, a second sensing region directly connected to a first portion of the first sensing region, a third sensing region separated from the second sensing region and directly connected to a second portion of the first sensing region, and a non-sensing region surrounding the first sensing region;
a plurality of touch electrode rows provided in each of the first sensing region, the second sensing region, and the third sensing region, the plurality of touch electrode rows including a plurality of first touch electrodes connected in a first direction;
a plurality of touch electrode columns provided in each of the first sensing region, the second sensing region, and the third sensing region, the plurality of touch electrode columns including a plurality of second touch electrodes connected in a second direction different from the first direction;
a plurality of first sensing lines provided in the non-sensing region and electrically connected to the plurality of touch electrode rows;
a plurality of second sensing lines provided in the non-sensing region and electrically connected to the plurality of touch electrode columns;
a first contact electrode provided in the non-sensing region, electrically insulated from at least one of the first touch electrodes, and electrically connecting at least one of the touch electrode columns and at least one of the second sensing lines; and
a bridge line provided in the non-sensing region and overlapping and intersecting the first contact electrode, and
wherein a portion of edges of each of the second sensing region and the third sensing region includes a curved side.

17. The display device of claim 16, wherein a width of each of the second sensing region and the third sensing region increases in the second direction.

18. The display device of claim 16, wherein the base layer has a shape in which the second sensing region and the third sensing region protrude from the first sensing region in the second direction, and has a recessed portion between the second sensing region and the third sensing region.

19. The display device of claim 16, wherein:
the display panel comprises a substrate including a first display region, a second display region, a third display region, and a non-display region surrounding the first display region, the second display region, and the third display region,
the second display region is directly connected to a first portion of the first display region, and
the third display region is separated from the second display region and is directly connected to a second portion of the first display region.

20. The display device of claim 19, wherein the substrate has a shape in which the second display region and the third display region protrude from the first display region in the second direction and has a recessed portion between the second display region and the third display region.

* * * * *